US012598533B2

(12) United States Patent　　　(10) Patent No.: US 12,598,533 B2
Botsinis et al.　　　　　　　　　　(45) Date of Patent: Apr. 7, 2026

(54) WLAN CELLULAR AGGREGATION

(71) Applicant: Apple Inc., Cupertino, CA (US)

(72) Inventors: Panagiotis Botsinis, Munich (DE);
Alperen Gundogan, Munich (DE);
Amr Abdelrahman Yousef A. Mostafa,
Munich (DE); Christian Hofmann,
Munich (DE); Sameh M Eldessoki,
Munich (DE); Tarik Tabet, Carlsbad,
CA (US); Xipeng Zhu, San Diego, CA
(US)

(73) Assignee: Apple Inc., Cupertino, CA (US)

( * ) Notice: Subject to any disclaimer, the term of this
patent is extended or adjusted under 35
U.S.C. 154(b) by 313 days.

(21) Appl. No.: 18/478,741

(22) Filed: Sep. 29, 2023

(65) Prior Publication Data

US 2025/0113283 A1　　Apr. 3, 2025

(51) Int. Cl.
H04W 40/02　　　(2009.01)
H04W 40/24　　　(2009.01)
(52) U.S. Cl.
CPC ......... H04W 40/02 (2013.01); H04W 40/246
(2013.01)
(58) Field of Classification Search
None
See application file for complete search history.

(56) References Cited

U.S. PATENT DOCUMENTS 10,206,151 B2 * 2/2019 Wu .................. H04W 36/00698
10,334,481 B2 * 6/2019 Hong ................ H04W 72/0453

10,440,765 B2 * 10/2019 Belghoul .......... H04W 28/0231
10,469,358 B2 * 11/2019 Lee ........................ H04L 5/0053
2018/0324826 A1 * 11/2018 Iskander ............. H04W 76/27
2019/0260608 A1 * 8/2019 Baboescu ............. H04W 36/14

OTHER PUBLICATIONS

4G/LTE—LWA; Sharenote; Overall Network Architecture for LWA;
https://www.sharetechnote.com/html/Handbook_LTE_LWA.html; Sep.
18, 2023.
3rd Generation Partnership Project; Technical Specification Group
Services and System Aspects; System architecture for the 5G
System (5GS); Stage 2 (Release 18); 3GPP TS 23.501 V18.3.0; Sep.
2023.

* cited by examiner

*Primary Examiner* — Brian S Roberts
(74) *Attorney, Agent, or Firm* — Eschweiler & Potashnik,
LLC; Matthew Glause

(57)　　　　ABSTRACT

Techniques described herein include solutions for wireless
local area network (WLAN) cellular aggregation (WCA). A
user equipment (UE) may be configured to communicate
with one or more base stations using both a direct cellular
link and a multi-hop WLAN link. The multi-hop WLAN link
may utilize a WLAN terminal as a relay. The WLAN
terminal may communicate with the UE via a WLAN
connection, and communicate with a base station via a
cellular connection. The WLAN terminal may utilize end-
point mapping information when forwarding packets from
the base station to the UE in downlink (DL), or from the UE
to the base station in uplink (UL). The endpoint mapping
information may be configured before the WCA transmis-
sions and stored in a memory of the WLAN terminal, or may
be indicated dynamically in a packet header of each WCA
transmission.

33 Claims, 14 Drawing Sheets

WLAN CELLULAR AGGREGATION

FIELD

This disclosure relates to wireless communication networks including techniques for communicating within wireless networks.

BACKGROUND

Wireless communication networks may include user equipments (UEs), base stations, and/or other types of wireless devices capable of communicating with one another. During operation, a UE may communicate using various radio access technologies (RATs) such as a wireless local area network (WLAN) RAT (e.g., Wi-Fi), and a cellular RAT (e.g., 4G, 5G, 6G, etc.).

BRIEF DESCRIPTION OF THE DRAWINGS

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

DETAILED DESCRIPTION

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

A user equipment (UE) may communicate within a wireless network by exchanging signaling with a base station. For example, the UE may transmit signals to the base station in the uplink (UL) direction, or receive signals from the base station in the downlink (DL) direction. The UE and the base station may communicate with one another on a licensed spectrum using a cellular radio access technology (RAT) such as a $2^{nd}$ generation (2G), $3^{rd}$ generation (3G), $4^{th}$ generation (4G) (e.g., long-term evolution (LTE)), $5^{th}$ generation (5G) (e.g., new radio (NR)), $6^{th}$ generation (6G), etc. in accordance with communication standards of the $3^{rd}$ generation partnership project (3GPP). Additionally, the UE may be capable of communicating on an unlicensed spectrum using a wireless local area network (WLAN) RAT such as Wi-fi, Bluetooth, or the like.

Depending on an operating environment of the UE, the UE may experience varying coverage by different RATs. For example, in outdoor environments, the UE may have cellular (e.g., 4G, 5G, etc.) coverage. In some indoor environments, the UE may have cellular and WLAN (e.g., Wi-fi) coverage. However, in other indoor environments (e.g., a basement), the UE may have WLAN coverage, but no cellular coverage.

Part of the continuing optimization of wireless networks is to increase network coverage, reliability, and data rates. Accordingly, the present disclosure relates to techniques for a UE to communicate with a base station by aggregating WLAN and cellular communication signals. In some aspects, in addition to a direct cellular link between the UE and the base station, a WLAN terminal acts as a relay in a multi-hop link between the UE and the base station. The WLAN terminal may communicate with the base station using a cellular link, and communicate with the UE using a WLAN link. In the DL direction, the WLAN terminal may receive packets from the base station via the cellular link, and forward the packets to the UE via the WLAN link. By utilizing both the direct link and the multi-hop link, reliability and/or data throughput can be increased. For example, to increase reliability, a packet can be duplicated and sent across both the direct link and the multi-hop link. Alternatively, packets can be split across the direct link and the multi-hop link, resulting in increased data throughput. A similar process may be applied in the UL direction, as described further in this disclosure.

Figure 1:
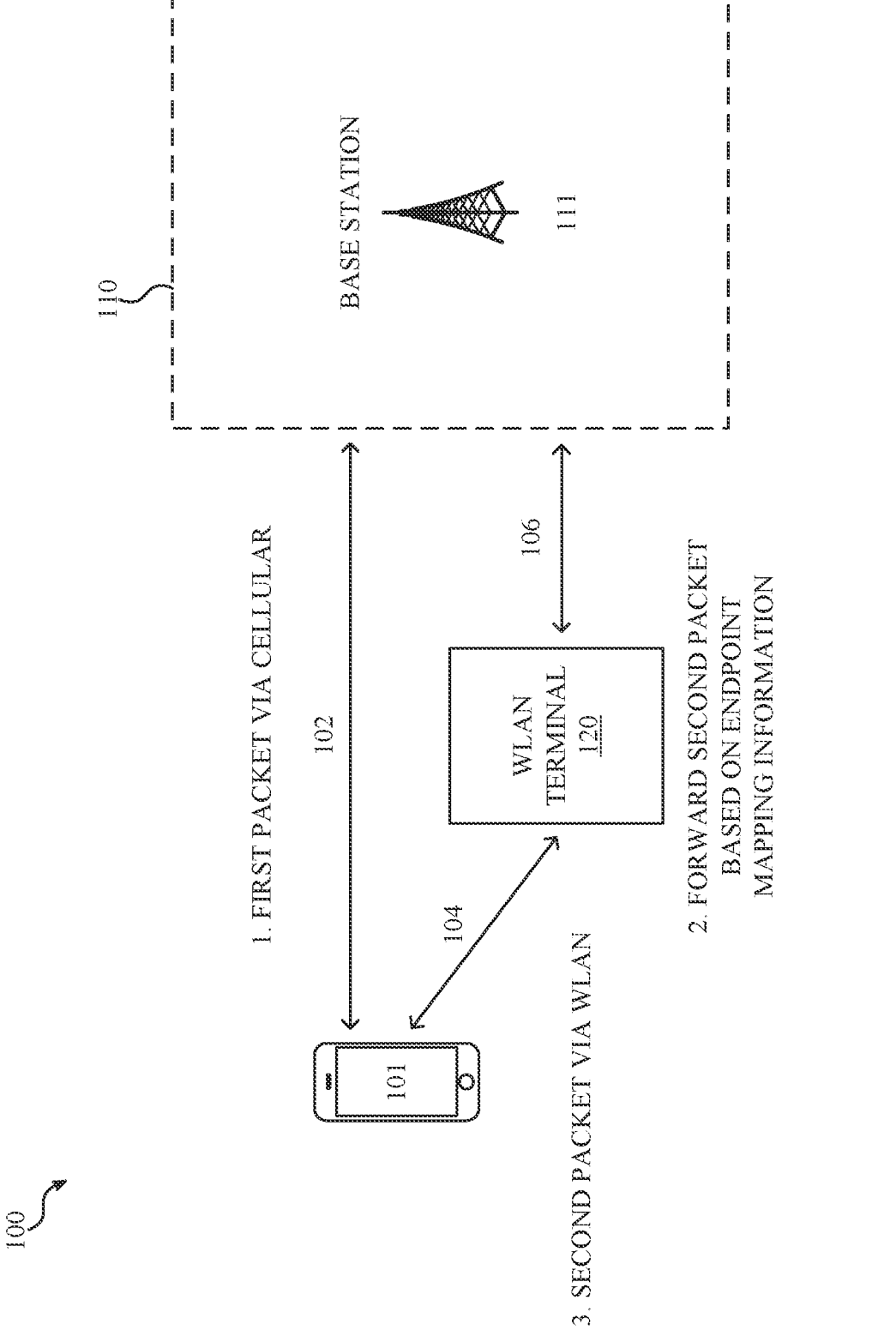
FIG. 1 is a block diagram illustrating a wireless network including a user equipment (UE) configured to communicate with a base station using wireless local area network (WLAN) cellular aggregation (WCA) in accordance with some aspects of the present disclosure.

FIG. 1 is a block diagram illustrating an example wireless network 100 in accordance with some aspects of the present disclosure. In the illustrated example, the wireless network 100 includes one or more UEs 101, a radio access network (RAN) 110, and a WLAN terminal 120. The RAN 110 includes one or more base stations 111. As shown, the UEs 101 may include smartphones, however, the UEs 101 may also include other suitable types of mobile or non-mobile computing devices. The one or more base stations 111, for example, may include a node B, evolved node B (eNB), next generation node B (gNB or ngNB), or the like. The systems and devices of the wireless network 100 may operate in accordance with one or more communication standards such as 2G, 3G, 4G, 5G, 6G, Wi-fi, etc. In some examples, the WLAN terminal 120 is a device that has both cellular (e.g., 2G, 3G, 4G, 5G, 6G, etc.) capabilities and WLAN (e.g., Wi-fi) capabilities. For example, the WLAN terminal 120 may be a mobile device (e.g., a UE), or a more static device (e.g., access point) having both cellular and WLAN capabilities. Furthermore, the WLAN terminal 120 may be user owned, or part of a cellular operator's network.

The devices of the wireless network 100 may communicate with one another using connections or channels 102, 104, 106. The UE 101 and the base station 111 may communicate with one another using the connection 102. Further, the UE 101 and the WLAN terminal 120 may communicate with one another using the connection 104. The WLAN terminal 120 and the base station 111 may communicate with one another using the connection 106. In some aspects, the connections 102, 106 are cellular connections, and the connection 104 is a WLAN connection. Although the present examples describes the connection 106 as a cellular connection, in alternative examples, the connection 106 may include a non-terrestrial network (NTN) connection, a wired ethernet connection, or another suitable type of connection.

In some aspects, the UE 101 is configured to communicate using WLAN and cellular signals simultaneously, which may be referred to herein as WLAN cellular aggregation (WCA). An example of WCA is illustrated by steps 1-3, which may occur in succession. In a DL example, at step 1, the base station 111 transmits a first packet to the UE 101 using a first cellular connection (e.g., connection 102). At step 2, the base station 111 transmits a second packet to the WLAN terminal 120 using a second cellular connection (e.g., connection 106). At step 3, the WLAN terminal 120 forwards the second packet to the UE 101 using a WLAN connection (e.g., connection 104) based on endpoint mapping information. In some examples, the connection 106 utilizes a same frequency range (FR) as the connection 102, such as FR1 or FR2. Alternatively, the connection 106 may utilize a different frequency range than the connection 102, in which case the frequency ranged utilized by the connection 106 may be reserved for WCA.

In an UL example, step 3 may be performed before step 2. At step 1, the UE 101 transmits a first packet to the base station 111 using a first cellular connection (e.g., connection 102). Subsequently, at step 3, the UE 101 transmits a second packet to the WLAN terminal 120 using a WLAN connection (e.g., connection 104). Subsequently, at step 2, the WLAN terminal 120 forwards the second packet to the base station 111 using a second cellular connection (e.g., connection 106) based on endpoint mapping information.

In some aspects, the endpoint mapping information includes a mapping between one or more radio bearers (RBs) and devices serving as endpoints of the one or more RBs. The UE 101 may be configured to communicate with the base station 111 using one or more RBs. An RB may include a data radio bearer (DRB) or a signaling radio bearer (SRB). A DRB may be used to carry data, while an SRB may be used to carry signaling messages such as radio resource control (RRC) or non-access stratum (NAS) messages.

In the DL example, the endpoint mapping information may map one or more RB identities (IDs) to a UE WLAN ID. The one or more RB IDs, for example, may identify one or more RBs used by the UE 101 to communicate with the base station 111. Based on an RB ID of an RB associated with the second packet, the WLAN terminal 120 may determine a UE WLAN ID of the UE 101 according to the endpoint mapping information, which may be used to forward the second packet to the UE 101.

In the UL example, the endpoint mapping information may map one or more first RB IDs to one or more second RB IDs respectively. The one or more first RB IDs may identify one or more RBs used by the UE 101 to communicate with the base station 111, and the one or more second RB IDs may identify one or more RBs used by the WLAN terminal 120 to communicate with the base station 111. Based on an RB ID of an RB associated with the second packet (e.g., a first RB ID), the WLAN terminal 120 may determine an RB ID of an RB to be used for forwarding the second packet to the base station 111 (e.g., a second RB ID) according to the endpoint mapping information.

In some aspects, the WLAN terminal 120 is configured with the endpoint mapping information before receiving the second packet, and the endpoint mapping information is stored in a memory of the WLAN terminal 120. In some alternative aspects, the endpoint mapping information is not stored in the memory of the WLAN terminal 120, and the endpoint mapping information is indicated in a packet header of the second packet. The manner in which the endpoint mapping information is communicated may vary, for example, depending on a capability of the WLAN terminal. A high capability WLAN terminal 120 may store the endpoint mapping information in its memory, while a low capability WLAN terminal 120 may utilize endpoint mapping information in the packet header.

In some examples, the second packet is different than the first packet (e.g., carries a different payload). For example, data transmission may be split between the first and second packets. By using both cellular and WLAN connections simultaneously, data throughput is increased. An additional benefit is that the UE 101 may conserve power by offloading cellular transmission/reception to the WLAN terminal 120. In some examples, non-latency critical packets are transmitted over the multi-hop link (e.g., 104 and 106), while latency-critical packets are transmitted over the direct link (e.g., 102).

In some examples, the second packet is a duplicate of the first packet (e.g., carries the same payload). In such examples, if a device (e.g., UE 101 or base station 111) receives both the first and second packet, the device may discard one of the first and second packets. In certain scenarios, the first packet may not be successfully received/decoded via cellular connection. For example, the first packet may not be successfully received if the UE 101 is in a building with poor cellular reception. In such scenarios, the second packet may be received from the WLAN terminal 120, which may have more powerful cellular capabilities than the UE 101. For example, the WLAN terminal 120 may have a larger number or size of antenna elements than the UE 101, and/or a fixed power supply (e.g., non-battery powered). By using the WLAN terminal 120 as a relay between the base station 111 and the UE 101, reliability and coverage (e.g., in indoor environments) is improved. Further, since the UE 101 is configured with both cellular and WLAN connections, handover to cellular only or WLAN only operation may be performed seamlessly.

Figure 2:
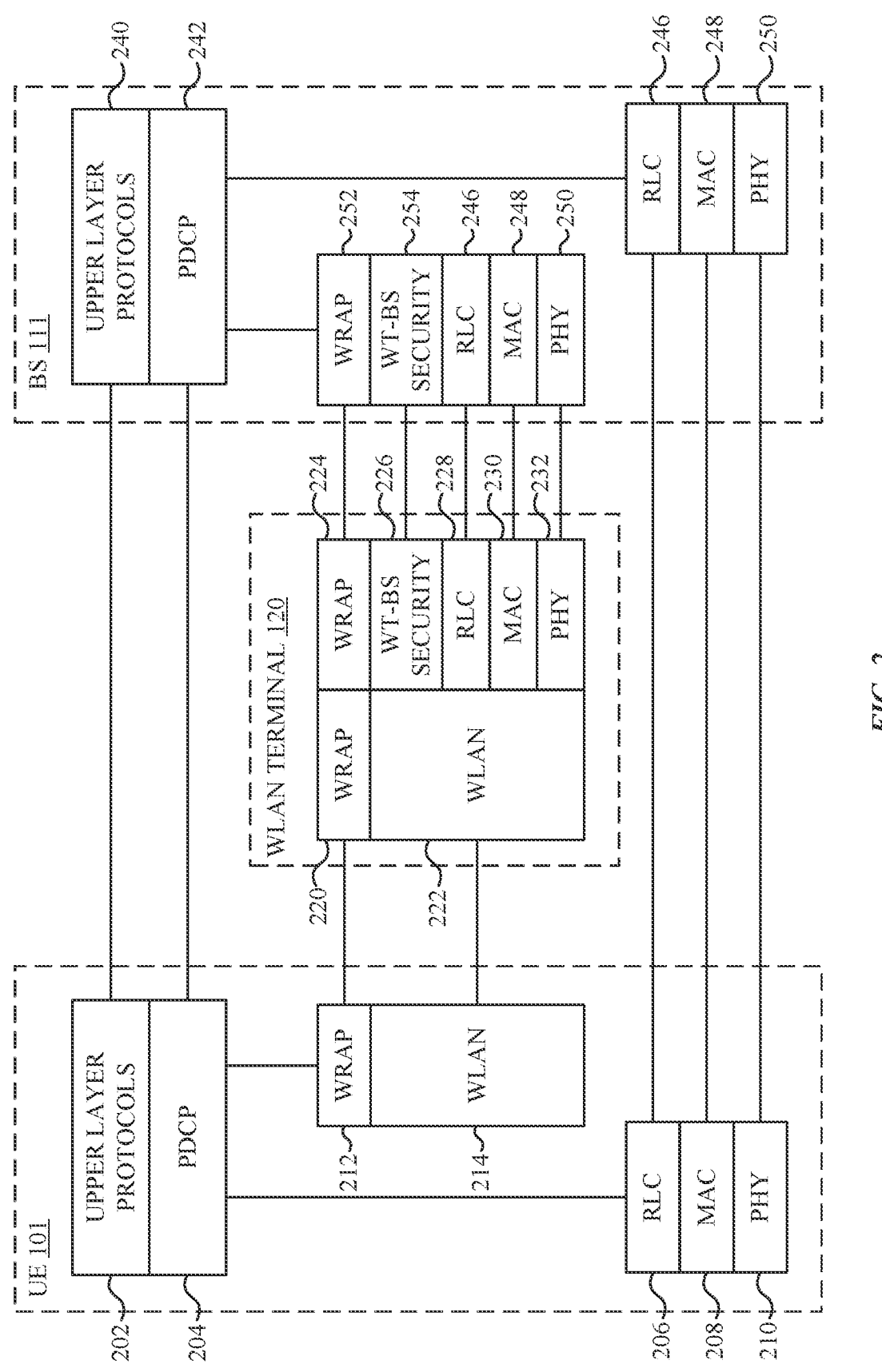
FIGS. 2-3 are schematic diagrams illustrating a UE, a WLAN terminal, and a base station configured to communicate using a WLAN relay adaptation protocol (WRAP) in accordance with some aspects of the present disclosure.

FIG. 2 is a schematic diagram illustrating example protocol stacks of a UE 101, a WLAN terminal 120, and a base station 111 in accordance with some aspects of the present disclosure.

The protocol stack of the UE 101 includes upper layer protocols 202, a packet data convergence protocol (PDCP) layer 204, a radio link control (RLC) layer 206, a medium access control (MAC) layer 208, and a physical layer 210, which may be part of a cellular protocol stack of the UE 101. The cellular protocol stack may be used by the UE 101 to communicate with the base station 111 via a cellular link (e.g., connection 102). Different types of signaling may be transmitted/received at different layers of the protocol stack. For example, the UE 101 may receive MAC control elements (CEs) at the MAC layer 208, physical downlink shared channel (PDSCH) transmissions at the physical layer 210, etc. Upon reception from the base station 111, a message may be passed to higher layers of the protocol stack to be processed by the UE 101. For example, a PDSCH message may be processed by the MAC layer 208, the RLC layer 206, the PDCP layer 204, etc. Similarly, a message may be received from higher layers of protocol stack before transmission at the physical layer 210. The upper layer protocols 202 may include a service data adaptation protocol (SDAP) layer, an RRC layer, a NAS layer, and/or other suitable types of layers.

The protocol stack of the base station 111 includes upper layer protocols 240, a PDCP layer 242, an RLC layer 246, a MAC layer 248, and a physical layer 250, which may be part of a cellular protocol stack of the base station 111. The cellular protocol stack may be used by the base station 111 to communicate with the UE 101 via a cellular link, for example, in a similar manner as described from the perspective of the UE 101. The upper layer protocols 240 may include an SDAP layer, an RRC layer, and/or other suitable type of layers.

The protocol stack of the UE 101 further includes a WLAN relay adaptation protocol (WRAP) layer 212, and a WLAN layer 214. The WLAN terminal 120 also includes a WRAP layer 220, and a WLAN layer 222. Signaling may be exchanged at the WRAP layers 212, 220 and/or the WLAN layers 214, 222 between the UE 101 and the WLAN terminal 120 via a WLAN link (e.g., connection 104). In some examples, the WRAP layer 212 and the WLAN layer 214 are part of a WLAN protocol stack of the UE 101, and the WRAP layer 220 and the WLAN layer 222 are part of a WLAN protocol stack of the WLAN terminal 120. The WLAN layers 212, 220 may include, for example, an internet protocol (IP) layer (e.g., IPsec). In some examples, a new ethernet type for WRAP packets is introduced into WLAN protocol, allowing WRAP packets to be carried directly over the WLAN layers 212, 220 without the use of an IP layer.

The WRAP layer (e.g., 212 and/or 220) may be used when exchanging packets with the WLAN terminal 120. In some examples, a WRAP header is added to the packet including information be used for WCA. The contents of the WRAP header may be used by the WLAN terminal 120 to determine the endpoint device (e.g., UE 101 or base station 111) to forward the packet to, or by the endpoint device itself to map the packet to the appropriate logical channel (e.g., RB). The WRAP header may include one or more of, a UE cellular identity (ID), a UE WLAN ID, an RB ID of an RB between the WLAN terminal 120 and the base station 111, or an RB ID of an RB between the UE 101 and the base station 111.

The protocol stack of the base station 111 further includes a WRAP layer 252, and a WLAN terminal-base station (WT-BS) security layer 254. Additionally, the WLAN terminal 120 includes a WRAP layer 224, a WT-BS security layer 226, an RLC layer 228, a MAC layer 230, and a physical layer 232. Signaling may be exchanged at the WRAP layers 224, 252, the WT-BS security layers 226, 254, the RLC layers 228, 246, the MAC layers 230, 248, and/or the physical layers 232, 250 between the WLAN terminal 120 and the base station 111 via a cellular link (e.g., connection 106).

The WT-BS security layer (e.g., 226 and/or 254) may be used to cipher/decipher data transmitted between the base station 111 and the WLAN terminal 120. WT-BS security may be activated or deactivated by the WLAN terminal 120, and an indication of whether WT-BS security is active may be provided by the WLAN terminal 120 to the base station 111 and/or the UE 101. When active, the WT-BS security layer may cipher/integrity protect a WRAP header of a packet and add a sequence number (SN) on the packet on the RB between the base station 111 and the WLAN terminal 120. In some examples, the SN of the packet that includes the WRAP header is used by a receiving device (e.g., base station 111 or WLAN terminal 120) to decipher the packet. Additionally or alternatively, the SN may be used to reorder packets at the receiver. WT-BS security may be used in combination with or alternatively to PDCP layer (e.g., cellular) security. In some examples, if PDCP layer security is enabled, no protocol data unit (PDU) re-ordering is used at the WT-BS security layer, since re-ordering will take place at the PDCP layer (e.g., 204 and/or 242).

In some examples, if the connection between the UE 101 and the WLAN terminal is secure (e.g., the WLAN terminal 120 provides ciphering), the WLAN terminal 120 is trusted, and the WT-BS security is enabled, then security at the PDCP layers 204, 242 may be disabled by the UE 101 and/or the base station 111. A WLAN terminal may provide an indication to the UE 101 whether it intends to provide a secure WLAN connection to the UE 101. Additionally, the WLAN terminal 120 may provide security at an application layer and/or transport layer across the WLAN link (e.g., 104). By disabling PDCP layer security, power can be saved at the UE 101 and/or at the base station 111.

Figure 3:
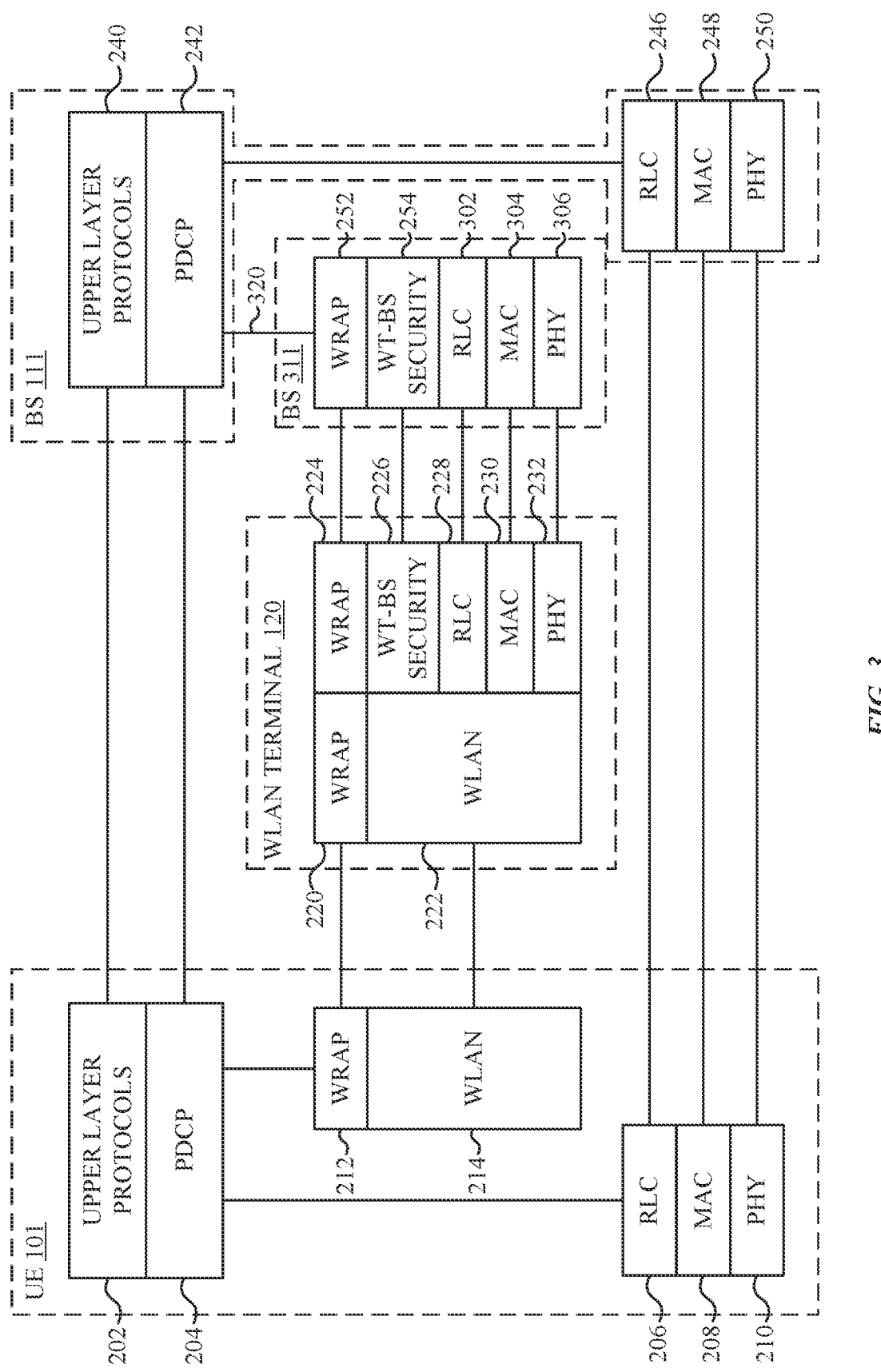

FIG. 3 is a schematic diagram illustrating example protocol stacks of a UE 101, a WLAN terminal 120, a base station 111, and a base station 311 in accordance with some aspects of the present disclosure. In some aspects, FIG. 3 resembles FIG. 2, but differs in that FIG. 3 additionally includes a base station 311. Similar to the base station 111, the base station 311 may be included in the RAN 110. A protocol stack of the base station 311 includes the WRAP layer 252, the WT-BS security layer 254, an RLC layer 302, a MAC layer 304, and a physical layer 306. The base station 311 may be different than the base station 111 that directly serves the UE 101, for example, due to the UE 101 and the WLAN terminal 120 utilizing different frequencies, RATs, etc. The base station 311 may communicate with the WLAN terminal 120, and forward packets between the WLAN terminal 120 and the base station 111 using a connection 320. For example, in the UL direction, the base station 311 may forward packets from the WLAN terminal 120 to the base station 111. In the DL direction, the base station 311 may forward packets from the base station 111 to the WLAN terminal 120.

The example of FIG. 3 may be considered as dual connectivity, such as multi RAT dual connectivity (MR-DC), where there is a relay on one of the two paths. The UE 101 may be configured with a master cell group (MCG) and a secondary cell group (SCG). In some examples, the MCG includes the base station 111, and the SCG includes the base station 311. The UE 101 and/or the base station 311 may select one or more WLAN terminals to be used in the SCG, for example, at a control layer. In the context of FIG. 3, the one or more WLAN terminals may include the WLAN terminal 120. Furthermore, the one or more WLAN terminals may be indicated to the MCG (e.g., the base station 111) by the UE 101 or by the base station 311. The RB between the WLAN terminal 120 and the base station 311 may be configured as an MCG-originated split bearer. For example, a DL packet is conveyed on one path directly from the base station 111 to the UE 101. Further, the DL packet is conveyed on another path from the base station 111 to the base station 311, to the WLAN terminal 120, and finally to the UE 101. Similarly, in UL, aggregation of signals received on both paths may take place at base station 111.

Figure 4:
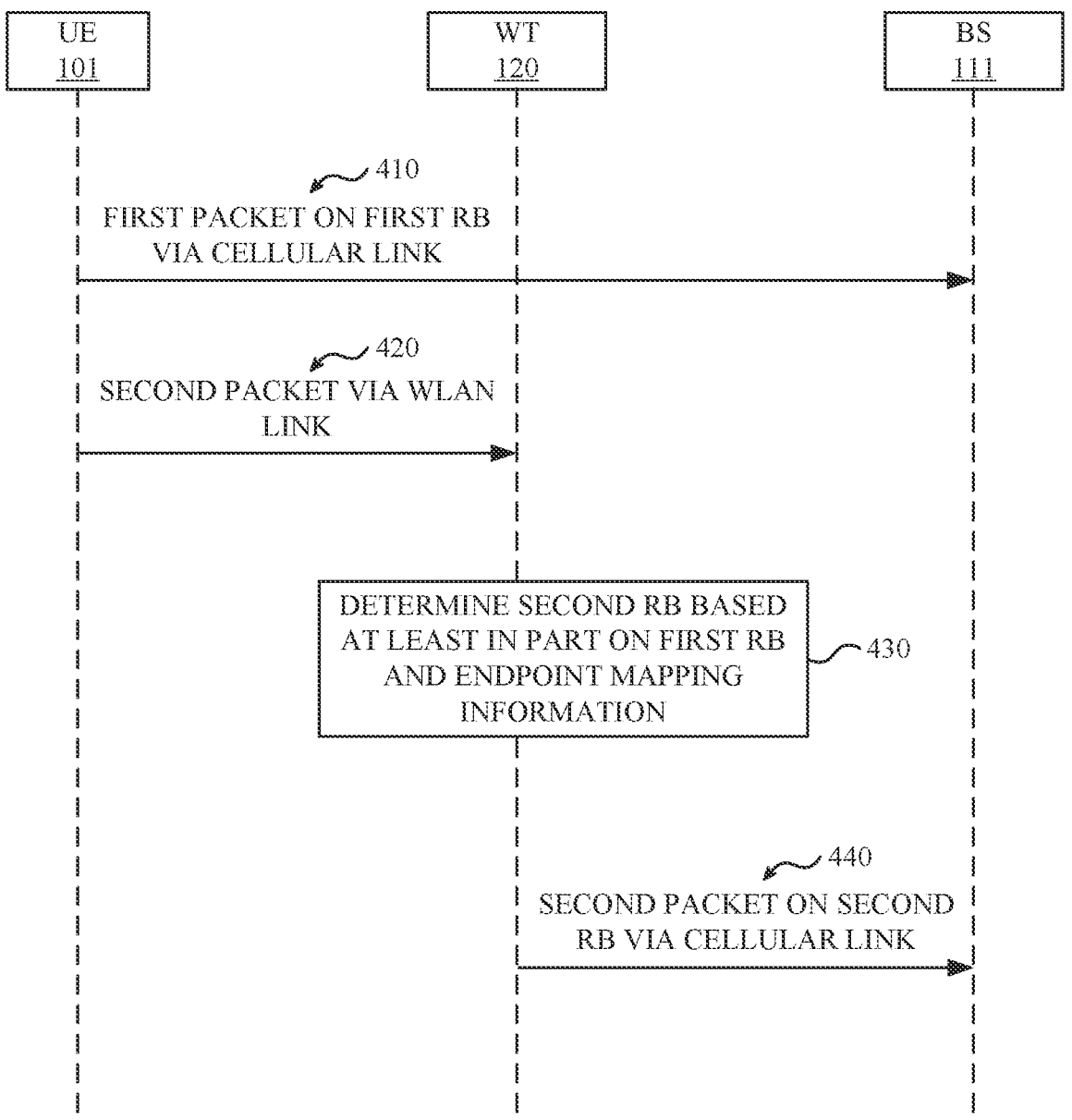
FIGS. 4-6 are schematic diagrams illustrating signaling between a UE, a WLAN terminal, and a base station for UL transmissions using WCA in accordance with some aspects of the present disclosure.
Figure 5:
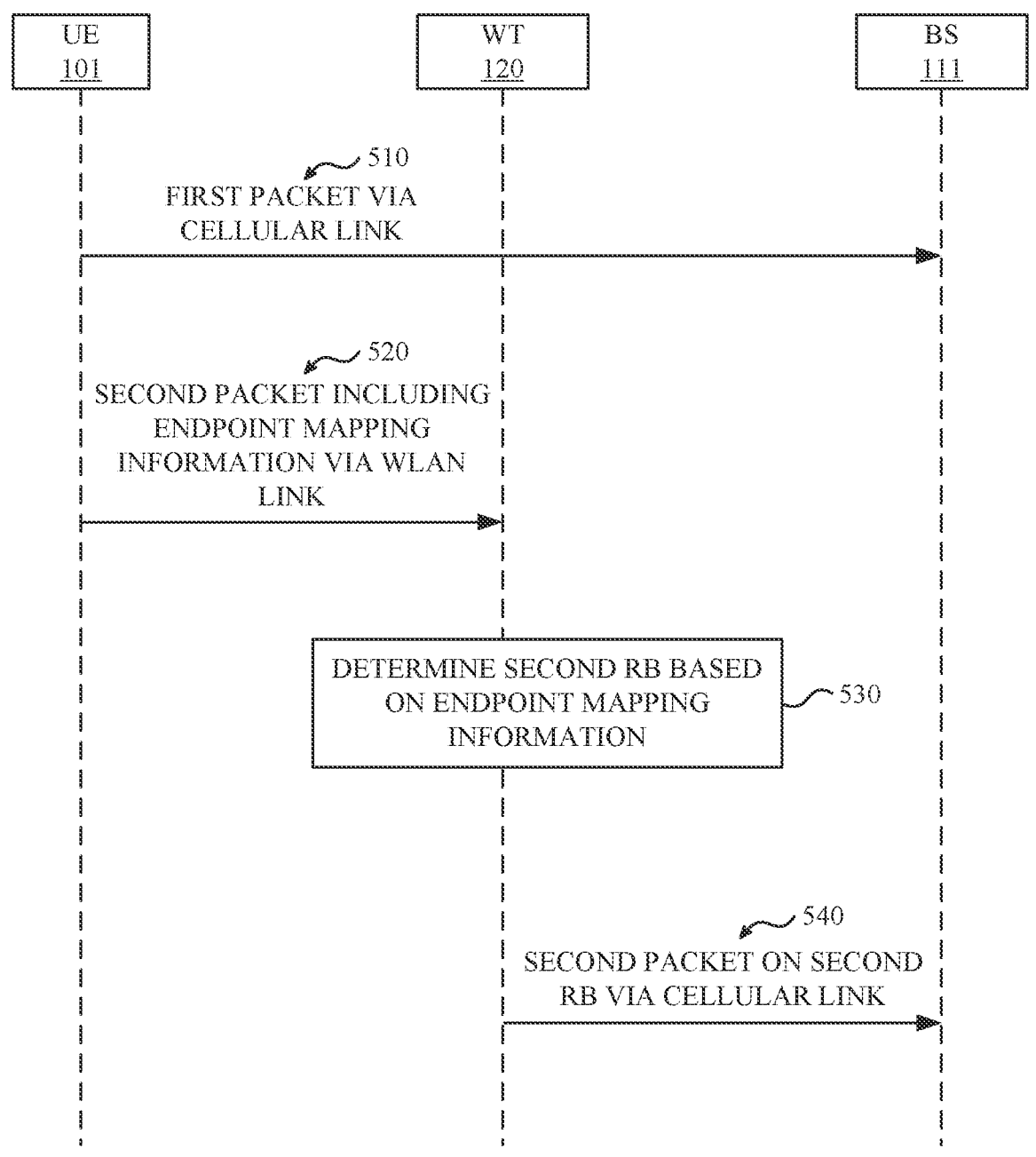
Figure 6:
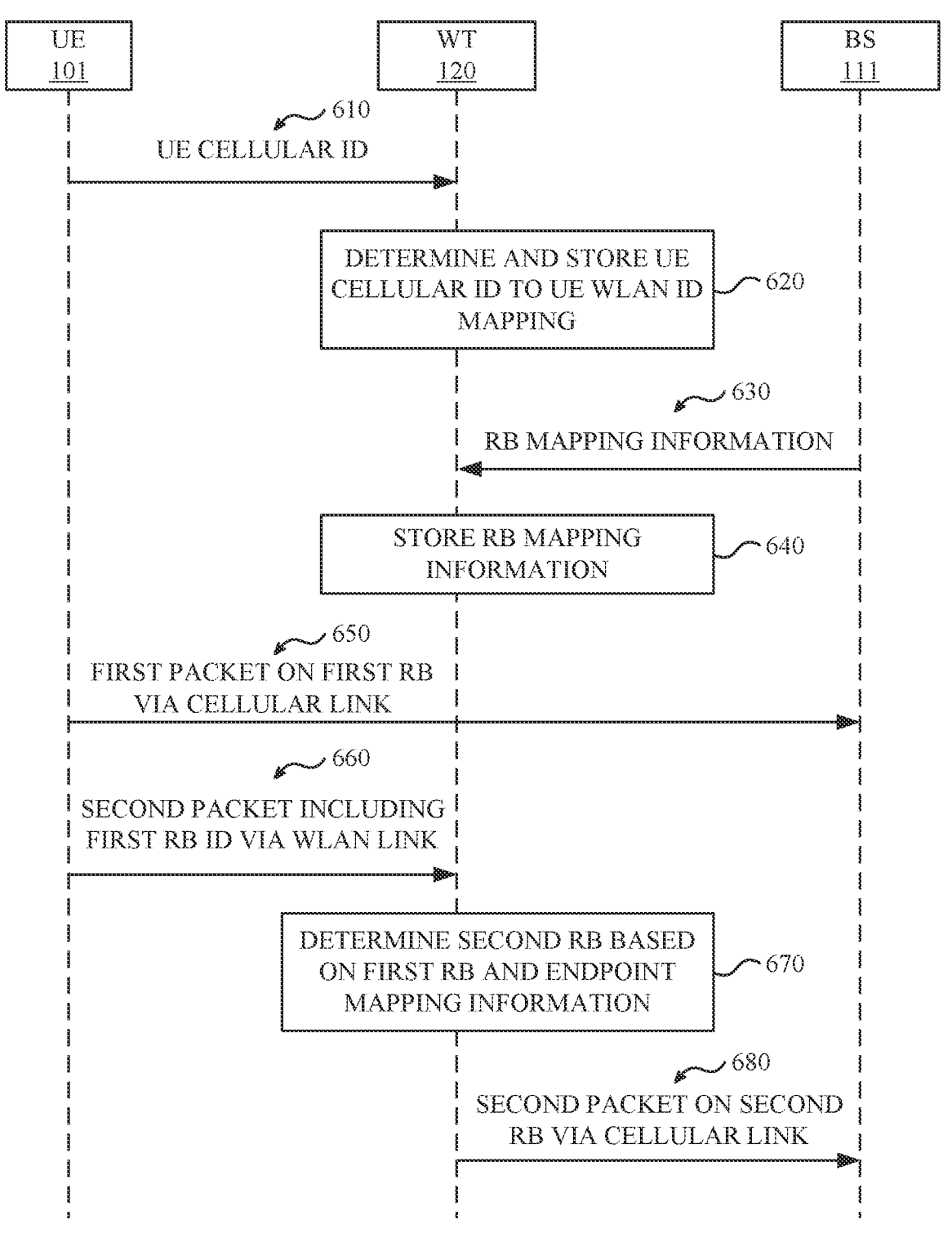

FIGS. 4-6 are schematic diagrams illustrating examples of signaling between a UE 101, a WLAN terminal 120, and a base station 111 for UL transmissions using WCA in accordance with some aspects of the present disclosure.

In the example of FIG. 4, at act 410, the UE 101 transmits a first packet to the base station 111 on a first RB via a first cellular link. The first RB may be an RB between the UE 101 and the base station 111. The first cellular link, for example, may be the connection 102 as described with reference to FIG. 1.

At act 420, the UE 101 transmits a second packet to the WLAN terminal 120 via a WLAN link. The second packet may be a duplicate of the first packet (e.g., packet duplication) or different than the first packet (e.g., packet split), as previously described. The WLAN link, for example, may be the connection 104 as described with reference to FIG. 1.

At act 430, the WLAN terminal 120 determines a second RB based, at least in part, on the first RB and endpoint mapping information.

At act 440, the WLAN terminal 120 transmits the second packet to the base station 111 on the second RB via a second cellular link. The second cellular link, for example, may be the connection 106, as described with reference to FIG. 1.

The manner in which the endpoint mapping information is indicated may vary, for example, based on a capability of the WLAN terminal 120 or other design considerations. As shown in FIG. 5, when the WLAN terminal has limited capability, the endpoint mapping information may be indicated to the WLAN terminal 120 with the second packet. As shown in FIG. 6, when the WLAN terminal has sufficient capability, the endpoint mapping information may be indicated or configured to the WLAN terminal 120 before the WLAN terminal 120 receives the second packet. Further details of indicating endpoint mapping information will now be described with reference to FIGS. 5-6.

As illustrated in the example of FIG. 5, the endpoint mapping information may be indicated to the WLAN terminal 120 in a same transmission as the second packet, for example in a packet header. In some aspects, the endpoint mapping information is configured and stored at the UE 101 and/or the base station 111 before performing WCA.

At act 510, the UE 101 transmits the first packet to the base station 111 via the first cellular link (e.g., connection 102). The UE 101 may transmit the first packet, for example, on the first RB.

At act 520, the UE 101 transmits the second packet to the WLAN terminal 120 via the WLAN link (e.g., connection 104), including the endpoint mapping information. The endpoint mapping information may be included in a packet header (e.g., WRAP header) of the second packet. For example, the endpoint mapping information may be stored in a memory of the UE 101, and added to the packet header of the second packet by the UE 101. In some examples, the endpoint mapping information includes a first RB ID and/or a second RB ID. The first RB ID may correspond to an RB between the UE 101 and the base station 111 (e.g., the first RB), and the second RB ID may correspond to an RB between the WLAN terminal 120 and the base station 111 (e.g., the second RB). In some examples, the packet header further includes a UE cellular ID of the UE 101.

At act 530, the WLAN terminal 120 determines the second RB based on the endpoint mapping information. For example, the second RB may be determined from the second RB ID in the packet header.

At act 540, the WLAN terminal 120 transmits the second packet to the base station 111 on the second RB via the second cellular link (e.g., connection 106). In some examples, the WLAN terminal 120 removes the second RB ID from the packet header before transmitting the second packet to the base station 111, such that the packet header includes the UE cellular ID and the first RB ID, but not the second RB ID. Upon receiving the second packet, the base station 111 may identify the associated logical channel from the first RB ID in the packet header, and identify the UE 101 from the UE cellular ID in the packet header.

As illustrated in the example of FIG. 6, the WLAN terminal 120 may be configured with the endpoint mapping information before receiving the second packet.

At act 610, the UE 101 indicates its UE cellular ID to the WLAN terminal 120. For example, the UE 101 may transmit a message to the WLAN terminal 120 via the WLAN link (e.g., connection 104) including the indication of the UE cellular ID.

In some aspects, the endpoint mapping information includes a UE cellular ID to UE WLAN ID mapping. The WLAN terminal 120 may determine the UE cellular ID to UE WLAN ID mapping at act 620. For example, upon establishing a connection with the WLAN terminal 120, the UE 101 may be assigned a UE WLAN ID by the WLAN terminal 120. Since the UE WLAN ID of the UE 101 is known by the WLAN terminal 120, upon receiving the UE cellular ID from the UE 101, a UE cellular ID to UE WLAN ID mapping can be created. Act 620 further includes storing the determined mapping, for example, in a memory of the WLAN terminal 120.

In some additional or alternative aspects, the endpoint mapping information includes RB mapping information. At act 630, the base station 111 transmits the RB mapping information to the WLAN terminal 120 via the second cellular link (e.g., connection 106). In some examples, the RB mapping information includes a mapping between the first RB ID (e.g., the RB ID corresponding to the RB between the UE 101 and the base station 111) and the second RB ID (e.g., the RB ID corresponding to the RB between the WLAN terminal 120 and the base station 111).

In some examples, the mapping between the first RB and the second RB is indicated on a per UE basis. For example, a UE cellular ID and first RB pair may be mapped to the second RB. During operation, the WLAN terminal 120 may communicate with a plurality of UEs configured for WCA. In certain scenarios, multiple UEs of the plurality of UEs may be configured with the first RB. Furthermore, the RB mapping may be different for each UE. By indicating the RB mapping on a per UE basis, the appropriate RB mapping can be applied for a given UE.

For simplicity, in the present example, a mapping between a first RB ID and a second RB ID is described. However, in alternative examples, the RB mapping includes a mapping between one or more first RB IDs and one or more second RBs IDs. For example, the UE 101 and the base station 111 may be configured to communicate using multiple RBs for data (e.g., DRBs) and/or control signaling (e.g., SRBs). The RB mapping may include a mapping between each RB between the UE 101 and the base station 111 to an RB between the WLAN terminal 120 and the base station 111, which may be used by the WLAN terminal 120 to forward packets as part of WCA.

At act 640, the WLAN terminal 120 stores the RB mapping information, for example, in the memory of the WLAN terminal 120.

At act 650, the UE 101 transmits the first packet to the base station 111 on the first RB via the first cellular link (e.g., connection 102).

At act 660, the UE 101 transmits the second packet to the WLAN terminal 120 via the WLAN link (e.g., connection 104). In some examples, a packet header (e.g., WRAP header) of the second packet includes the first RB ID.

At act 670, the WLAN terminal 120 determines the second RB based on the first RB and the endpoint mapping information. For example, the WLAN terminal 120 may determine the second RB by referring to the first RB ID, the UE cellular ID, and the RB mapping information. The UE cellular ID may be determined by the WLAN terminal 120 based on the UE cellular ID to UE WLAN ID mapping.

At act 680, the WLAN terminal 120 transmits the second packet to the base station 111 on the second RB via the second cellular link (e.g., connection 106). In some examples, the WLAN terminal 120 adds the UE cellular ID to the packet header before transmitting the second packet to the base station 111, such that the packet header includes the UE cellular ID and the first RB ID. Upon receiving the second packet, the base station 111 may identify the associated logical channel from the first RB ID in the packet header, and identify the UE 101 from the UE cellular ID in the packet header.

Figure 7:
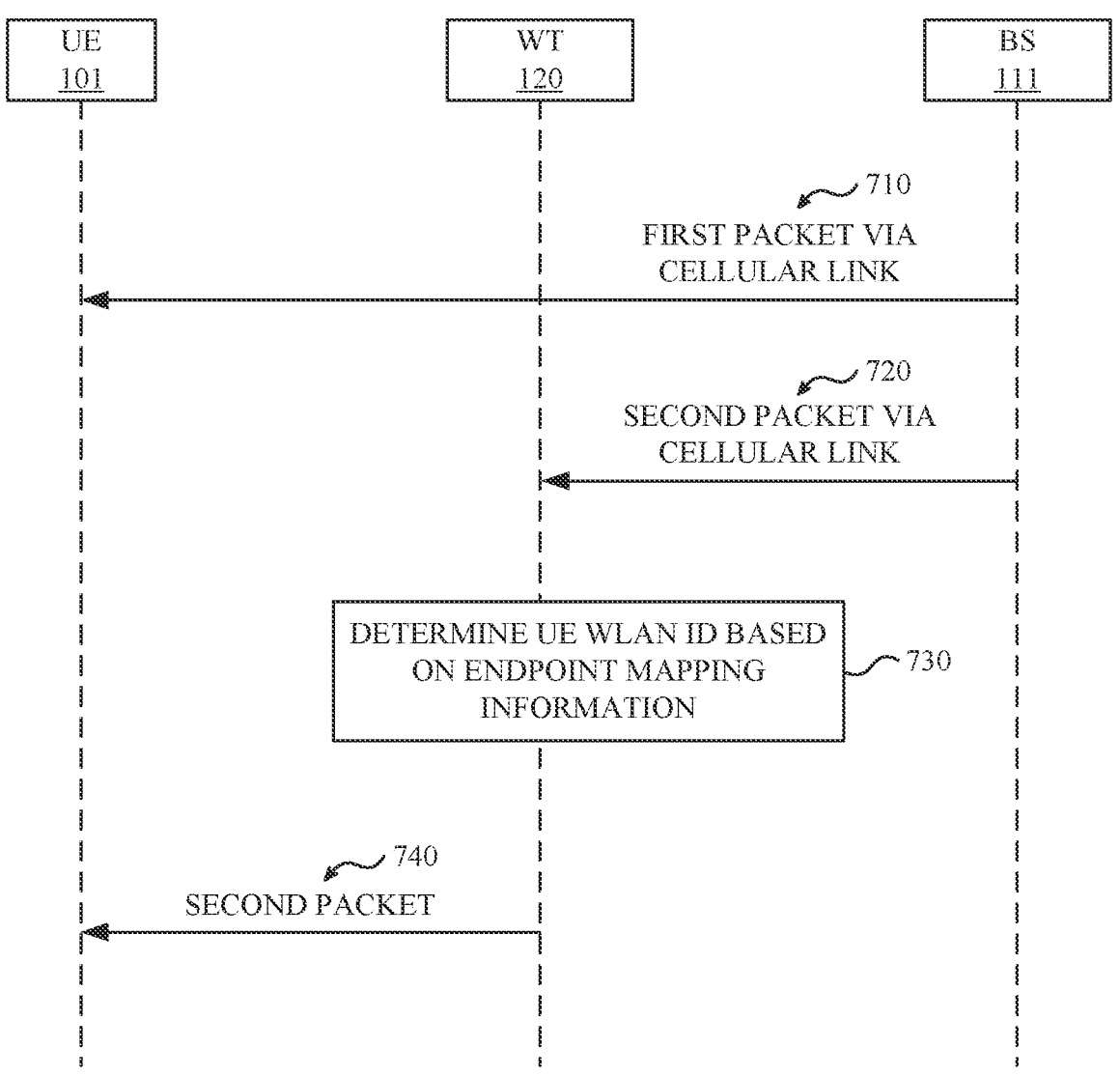
FIGS. 7-9 are schematic diagrams illustrating signaling between a UE, a WLAN terminal, and a base station for DL transmissions using WCA in accordance with some aspects of the present disclosure.
Figure 8:
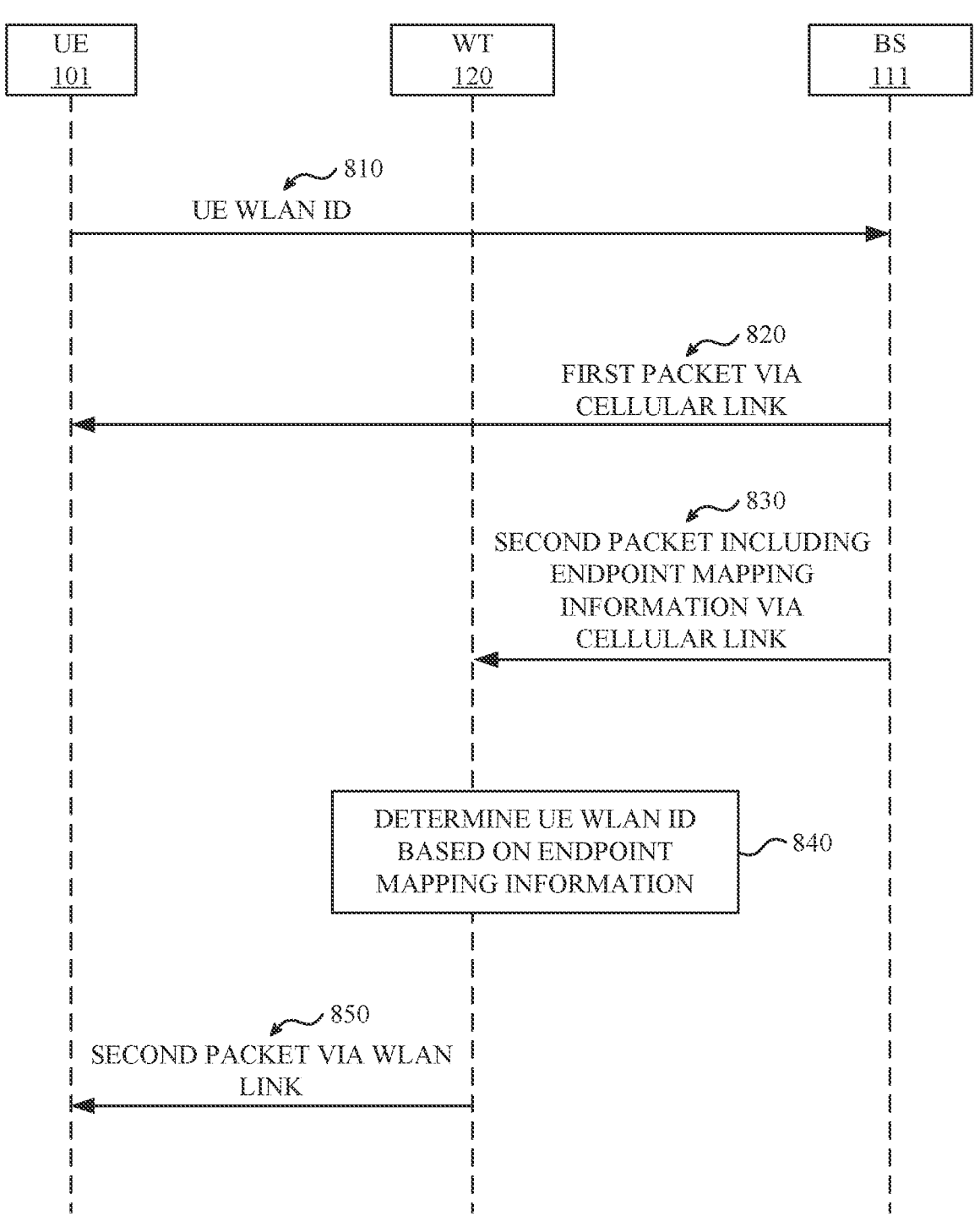
Figure 9:
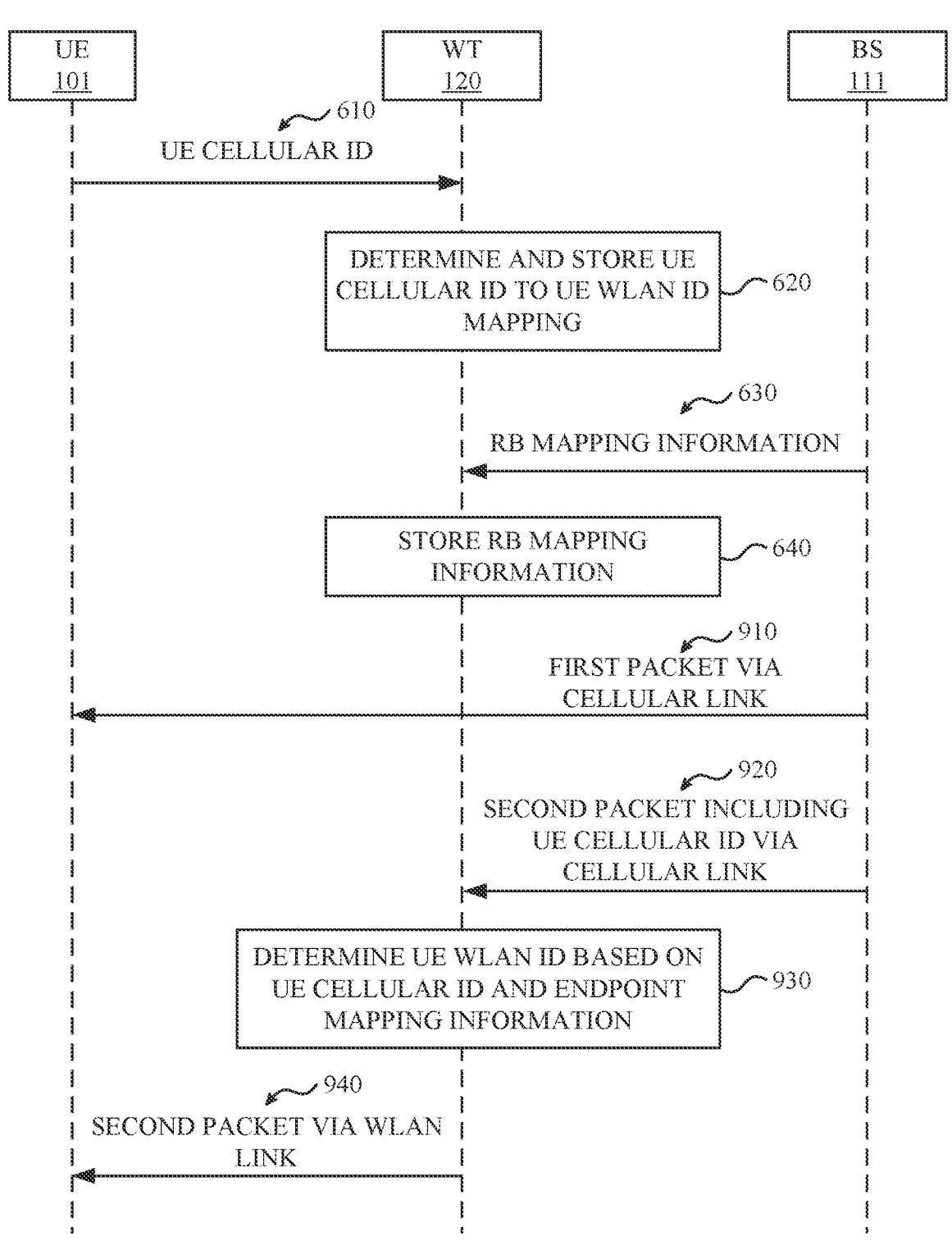

FIGS. 7-9 are schematic diagrams illustrating examples of signaling between a UE 101, a WLAN terminal 120, and a base station 111 for DL transmissions using WCA in accordance with some aspects of the present disclosure.

In the example of FIG. 7, at act 710, the base station 111 transmits a first packet to the UE 101 via a first cellular link (e.g., connection 102). The first packet may be transmitted on a first RB, which may be an RB between the UE 101 and the base station 111.

At act 720, the base station 111 transmits a second packet to the WLAN terminal 120 via a second cellular link (e.g., connection 106). The second packet may be transmitted on a second RB, which may be an RB between the WLAN terminal 120 and the base station 111. The second packet may be a duplicate of the first packet (e.g., packet duplication) or different than the first packet (e.g., packet split), as previously described.

At act 730, the WLAN terminal 120 determines a UE WLAN ID based on endpoint mapping information. The UE WLAN ID may be a UE WLAN ID of the UE 101, which may be used by the WLAN terminal 120 to transmit the second packet to the UE 101.

At act 740, the WLAN terminal 120 transmits the second packet to the UE 101 via a WLAN link (e.g., connection 104).

Similar to FIG. 4, the manner in which the endpoint mapping information is indicated may vary, for example, based on a capability of the WLAN terminal 120. As shown in FIG. 8, the endpoint mapping information may be indicated to the WLAN terminal 120 with the second packet, or as shown in FIG. 9, the endpoint mapping information may be indicated to the WLAN terminal 120 and stored by the WLAN terminal 120 before the WLAN terminal 120 receives the second packet. Further details of indicating endpoint mapping information will now be described with reference to FIGS. 8-9.

As illustrated in the example of FIG. 8, the endpoint mapping information may be indicated to the WLAN terminal 120 in a same transmission as the second packet. In some aspects, the endpoint mapping information is configured and stored at the UE 101 and/or the base station 111 before performing WCA.

At act 810, the UE 101 indicates its UE WLAN ID to the base station 111. For example, the UE 101 may transmit a message to the base station 111 via the first cellular link (e.g., connection 102) including the indication of the UE WLAN ID. The UE WLAN ID, for example, may be assigned to the UE 101 by the WLAN terminal 120 upon establishing a connection with the WLAN terminal 120.

At act 820, the base station 111 transmits the first packet to the UE 101 via the first cellular link. The base station 111 may transmit the first packet, for example, on the first RB.

At act 830, the base station 111 transmits the second packet to the WLAN terminal 120 via the second cellular link (e.g., connection 106), including the endpoint mapping information. The endpoint mapping information may be included in a packet header (e.g., WRAP header) of the second packet. For example, the endpoint mapping information may be stored in a memory of the base station 111, and added to the packet header of the second packet by the base station 111. In some examples, the endpoint mapping information includes a first RB ID and/or the UE WLAN ID. The first RB ID may correspond to the first RB between the UE 101 and the base station 111. The UE WLAN ID may be the UE WLAN ID indicated by the UE 101 at act 810.

At act 840, the WLAN terminal 120 determines the UE WLAN ID based on the endpoint mapping information. For example, the UE WLAN ID may be determined from the packet header of the second packet.

At act 850, the WLAN terminal 120 transmits the second packet to the UE 101 via the WLAN link (e.g., connection 104). In some examples, the WLAN terminal 120 removes the UE WLAN ID from the packet header before transmitting the second packet to the UE 101, such that the packet header includes the first RB ID, but not the UE WLAN ID. Upon receiving the second packet, the UE 101 may identify the associated logical channel from the first RB ID in the packet header.

As illustrated in the example of FIG. 9, the WLAN terminal 120 may be configured with the endpoint mapping information before receiving the second packet. As shown, the example of FIG. 9 includes acts 610, 620, 630, 640, which may be consistent with acts 610, 620, 630, 640 as described with reference to FIG. 6.

At act 910, the base station 111 transmits the first packet to the UE 101 via the first cellular link (e.g., connection 102). The base station 111 may transmit the first packet, for example, on the first RB.

At act 920, the base station 111 transmits the second packet to the WLAN terminal 120 via the second cellular link (e.g., connection 106), including the UE cellular ID of the UE 101. The UE cellular ID may be included in a packet header (e.g., WRAP header) of the second packet. In some examples, the packet header further includes the first RB ID corresponding to the first RB between the UE 101 and the base station 111.

At act 930, the WLAN terminal 120 determines the UE WLAN ID of the UE 101 based on the UE cellular ID and the endpoint mapping information. For example, the WLAN terminal 120 may determine the UE WLAN ID by referring to the UE cellular ID in the packet header of the second packet and the endpoint mapping information.

At act 940, the WLAN terminal 120 transmits the second packet to the UE 101 via the WLAN link (e.g., connection 104). In some examples, the WLAN terminal 120 removes the UE cellular ID from the packet header before transmitting the second packet to the UE 101, such that the packet header includes the first RB ID, but not the UE cellular ID. Upon receiving the second packet, the UE 101 may identify the associated logical channel from the first RB ID in the packet header.

Figure 10:
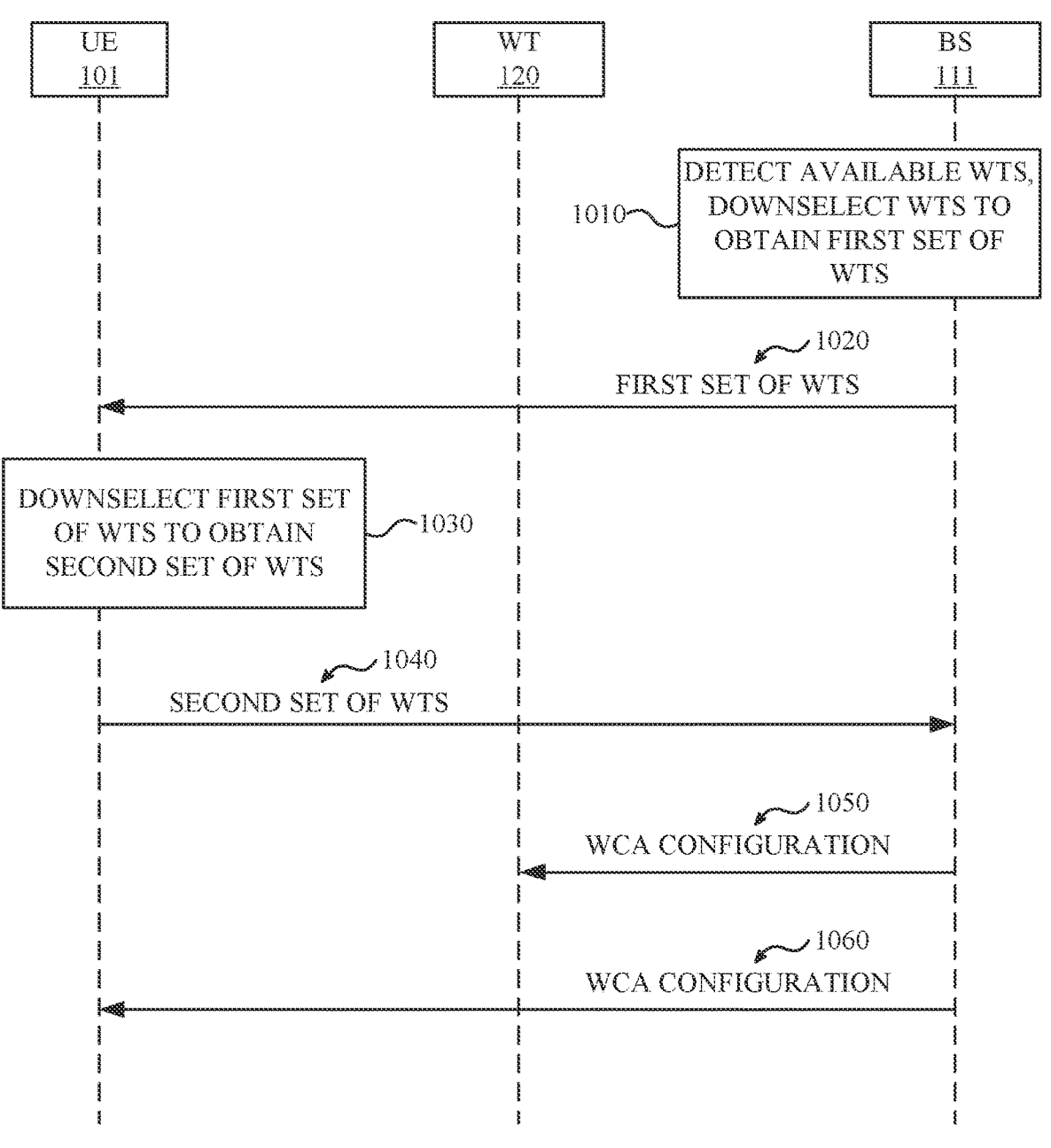
FIGS. 10-11 are schematic diagrams illustrating signaling between a UE, a WLAN terminal, and a base station during WLAN terminal discovery procedures in accordance with some aspects of the present disclosure.
Figure 11:
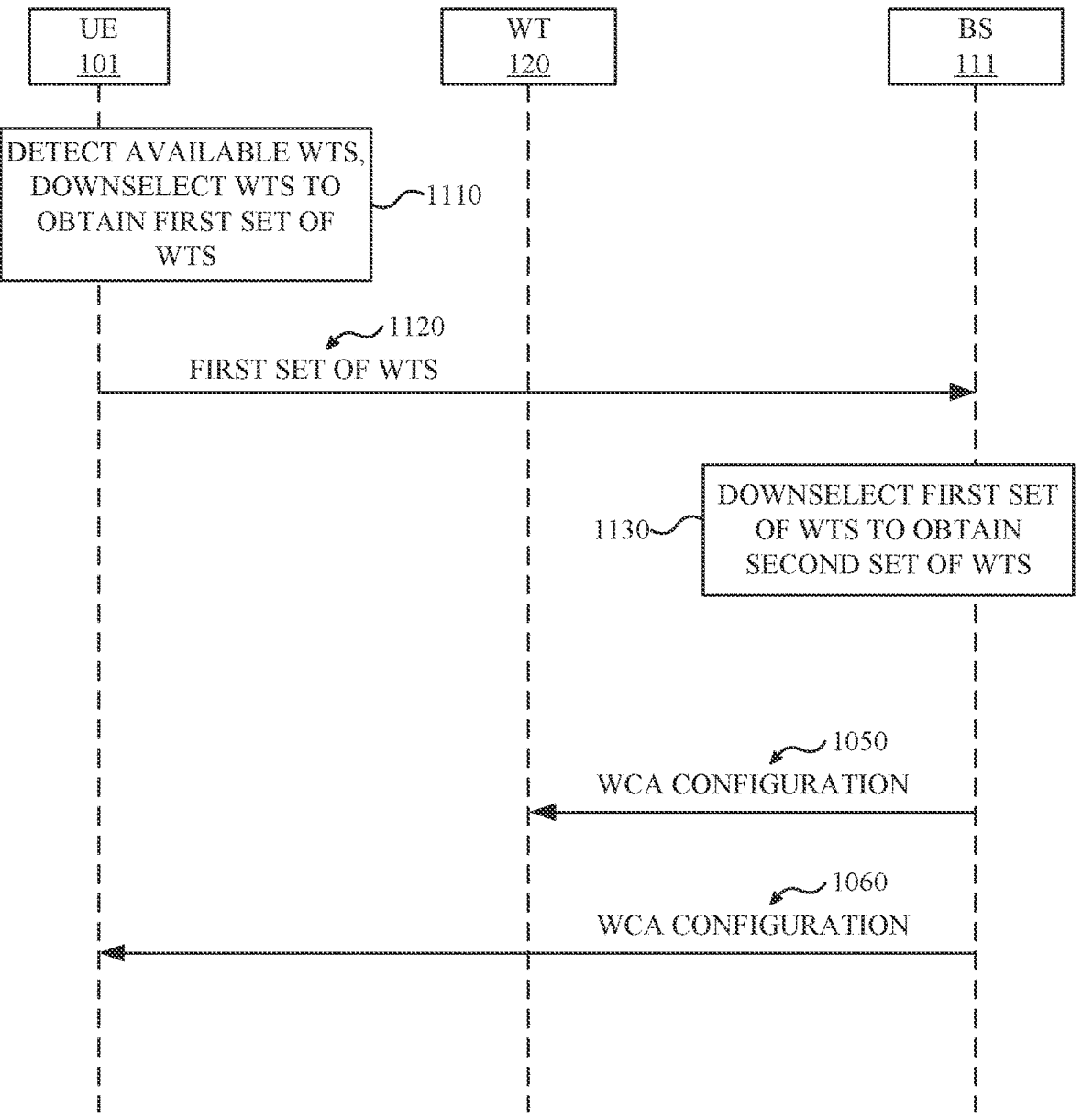

FIGS. 10-11 are schematic diagrams illustrating examples of signaling between a UE 101, a WLAN terminal 120, and a base station 111 during a WLAN terminal discovery procedure in accordance with some aspects of the present disclosure. In some aspects, the WLAN discovery procedure of FIG. 10 or FIG. 11 is performed before performing UL or DL transmissions using WCA, as in FIGS. 4-9.

As illustrated in the example of FIG. 10, WLAN terminal discovery may be network driven and the base station 111 may perform initial WLAN terminal detection. At act 1010, the base station 111 detects available WLAN terminals. The base station 111 may detect that the WLAN terminals are available, for example, in response to the WLAN terminals advertising themselves as WLAN relay nodes (e.g., for WCA). Further, the base station 111 may collect information about the available WLAN terminals, and down-select the set of available WLAN terminals to produce a first set of WLAN terminals. The first set of WLAN terminals may be a list of candidate WLAN terminals for WCA, which may be further down-selected by the UE 101 (e.g., at act 1030). In some examples, the information about the available WLAN terminals includes one or more of: a capability of the WLAN terminal (e.g., whether the WLAN terminal is capable to act as a relay), whether the WLAN terminal is willing to act as a relay, a trust level of the WLAN terminal, a receive signal strength associated with the WLAN terminal, or a density of UEs in proximity to the WLAN terminal. A WLAN terminal may not be willing to act as a relay, for example, if it is low on power. A trust level of a WLAN terminal may be determined by the UE 101 or the base station 111. In some examples, the base station 111 prioritizes WLAN terminals that are in proximity with a high density of UEs when down-selecting, in order to increase network efficiency. The WLAN terminal 120 may be a mobile device (e.g., a UE) or non-mobile device (e.g., an access point).

At act 1020, the base station 111 indicates the first set of WLAN terminals to the UE 101 and pre-configures the UE 101 with information about the first set of WLAN terminals. For example, the base station 111 may configure a list of trusted and/or untrusted WLAN terminals and/or configure a split RB configuration. The split RB configuration may configure multiple data paths for a single RB, which may be used for packet split or packet duplication, as previously described. As an example, the split RB configuration may configure a direct path (e.g., 102) and a multi-hop path (e.g., 104 and 106) between the UE 101 and the base station 111. The split RB configuration may further include one or more of: a threshold data amount, a percentage of data assigned to the direct path, a percentage of data assigned to the multi-hop path, and/or an indication whether packet duplication is activated. In some examples, the UE 101 and the base station 111 utilize a non-split RB (e.g., direct path or multi-hop path), and switch to a split RB (e.g., direct path and multi-hop path) in response to the threshold data amount being exceeded. The threshold data amount may be compared to, for example, a data throughput on the RB (e.g., in bytes). When using the split RB, the percentage of data assigned to each path may be determined from the split RB configuration. In another example, the split RB configuration may indicate that packet duplication is activated. When packet duplication is activated, the same packet may be duplicated and transmitted using the split RB (e.g., both the direct path and the multi-hop path), as previously described.

At act 1030, the UE 101 down-selects the first set of WLAN terminals to obtain a second set of WLAN terminals (e.g., a subset of the first set of WLAN terminals). The UE 101 may down-select the first set of WLAN terminals, for example, based on a trust level of the WLAN terminals, based on a capability of the WLAN terminals, based on a willingness of the WLAN terminals to act as a relay, and/or based on a signal strength associated with each of the WLAN terminals.

At act 1040, the UE 101 indicates the second set of WLAN terminals to the base station 111.

At act 1050, the base station 111 transmits a WCA configuration message to the WLAN terminal 120 to configure the WLAN terminal 120 for WCA. The base station 111 may configure the WLAN terminal 120 for WCA, for example, in response to the second set of WLAN terminals including the WLAN terminal 120. The WCA configuration may include information such as an RB configuration to configure RB(s) between the WLAN terminal 120 and the base station 111, scheduling policies, and/or priorities between UEs. In some examples, the RB configuration further configures RB(s) between the WLAN terminal 120 and other base stations, such as the base station 311. The scheduling policies and/or priorities between UEs may be used by the WLAN terminal 120 when performing WCA. The WCA configuration may be included, for example, in an RRC message.

At act 1060, the base station 111 transmits a WCA configuration message to the UE 101 to configure the UE 101 for WCA. For example, the base station 111 may configure UE 101 with a mapping between an RB between the UE 101 and the base station 111 (e.g., a first RB) and an RB between the WLAN terminal 120 and the base station 111 (e.g., a second RB). Although the example of a single RB mapping for a single WLAN terminal is given, the WCA configuration message may configure multiple RB mappings for multiple WLAN terminals (e.g., in the second set of WLAN terminals). In some examples, the WCA configuration further indicates a WLAN terminal (e.g., WLAN terminal 120) of the multiple WLAN terminals to be used by the UE 101 for WCA. The WCA configuration may be included, for example, in an RRC message. In some examples, act 1060 is only performed when the WLAN terminal 120 is a low capability WLAN terminal, and the UE 101 indicates endpoint mapping information in the packet header (e.g., as in FIGS. 5 and 8, optionally in FIGS. 4 and 7).

In some examples, the UE 101 selects a WLAN terminal (e.g., WLAN terminal 120) to be used for WCA. In such examples, the UE 101 may transmit an indication of the selected WLAN terminal to the base station 111, which may occur after act 1050 or act 1060.

In some additional or alternative examples, act 1030 and/or act 1040 are not performed, and the UE 101 does not indicate the second set of WLAN terminals to the base station 111. In such examples, the base station 111 may configure the first set of WLAN terminals in the WCA configurations at acts 1050 and 1060.

As illustrated in FIG. 11, WLAN terminal discovery may be UE driven and the UE 101 may perform initial WLAN terminal detection. At act 1110, the UE 101 detects WLAN terminals available for WCA. In some examples, information that a WLAN terminal is capable of and/or willing to act as a WLAN relay node may be provided by the WLAN terminal to the UE 101 at higher layers after the UE 101 has been associated with the WLAN terminal. Additionally or alternatively, the WLAN terminal may include such information in a periodically transmitted signal (e.g., beacon signal), for example, as vendor specific data (e.g., WLAN relay supported). In some examples, during cellular handover, a target base station may configure the UE with a list of nearby WLAN terminals. Further, the target base station may provide the UE with security credentials to be used to access the WLAN terminals, which may allow for seamless or near seamless handover between WLAN terminals.

Further, at act 1110, the UE 101 may down-select the set of available WLAN terminals, for example, based on a trust level of each of the WLAN terminals, based on a capability of each of the WLAN terminals (e.g., to act as a relay), based on a willingness of each of the WLAN terminals to act as a relay, and/or based on a signal strength associated with each of the WLAN terminals.

At act 1120, the UE 101 indicates the first set of WLAN terminals to the base station 111. In some examples, the indication further includes a request for WCA configuration by the base station 111.

At act 1130, the base station 111 down-selects the first set of WLAN terminals to obtain a second set of WLAN terminals. The base station 111 may down-select the first set of WLAN terminals, for example, based on a trust level of each of the WLAN terminals, based on a capability of each of the WLAN terminals (e.g., to act as a relay), based on a willingness of each of the WLAN terminals to act as a relay, based on a signal strength associated with each of the WLAN terminals, and/or based on a density of UEs in proximity to each of the WLAN terminals.

At act 1050, the base station 111 transmits a WCA configuration message to the WLAN terminal 120, which may be consistent with act 1050 as described with reference to FIG. 10.

At act 1060, the base station 111 transmits a WCA configuration message to the UE 101, which may be consistent with act 1060 as described with reference to FIG. 10.

Similar to FIG. 10, in some examples, the UE 101 selects a WLAN terminal (e.g., WLAN terminal 120) to be used for WCA. In such examples, the UE 101 may transmit an indication of the selected WLAN terminal to the base station 111, which may occur after act 1050 or act 1060.

Figure 12:
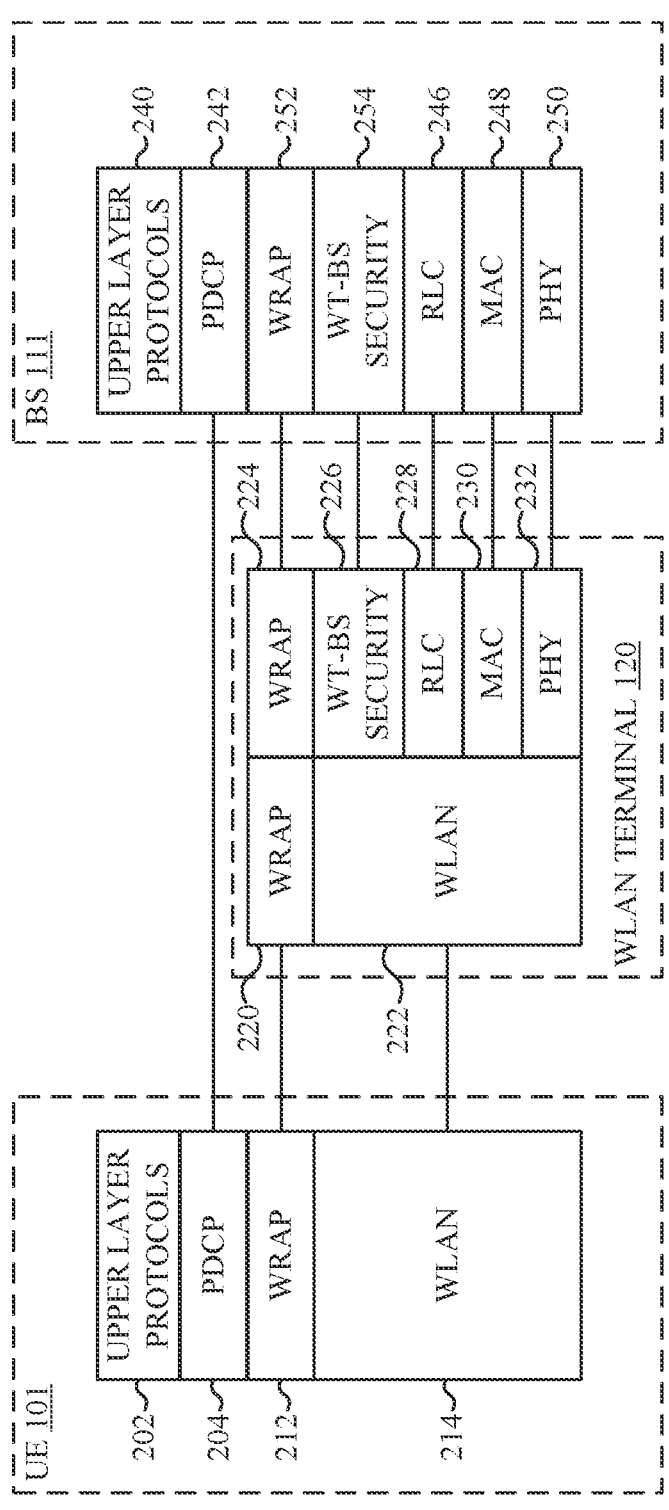
FIG. 12 is a schematic diagram illustrating a UE, a WLAN terminal, and a base station configured to communicate using WRAP in accordance with some aspects of the present disclosure.

FIG. 12 is a schematic diagram illustrating example protocol stacks of a UE 101, a WLAN terminal 120, and a base station 111 in accordance with some aspects of the present disclosure. In some examples, FIG. 12 resembles FIG. 2, but differs in that the UE 101 deactivates one or more of its cellular protocol stack layers. The UE 101 may still communicate with the base station 111 via the WLAN terminal 120 using WLAN communications.

In certain scenarios, the UE 101 may not have cellular connectivity, but may still be able to communicate with the base station 111 via the WLAN terminal 120 (e.g., via multi-hop link). For example, the UE 101 may be out of cellular coverage of the base station 111, but may have a WLAN connection with the WLAN terminal 120. Alternatively, the UE 101 may temporarily disable cellular functionalities, for example, in a power saving mode. In such scenarios, the UE 101 may communicate with the base station 111 via the WLAN terminal 120, without establishing a direct cellular link with the base station.

In some examples, the base station 111 configures one or more RBs between the UE 101 and the base station 111, despite not having a direct cellular link with the UE 101. By configuring the one or more RBs, the base station 111 and the UE 101 may communicate in a similar manner as described with reference to FIG. 2.

In the example of FIG. 12, a protocol stack of the UE 101 includes upper layer protocols 202, a PDCP layer 204, a WRAP layer 212, and a WLAN layer 214. A protocol stack of the WLAN terminal 120 includes a WRAP layer 220, and a WLAN layer 222, which may be used to communicate with the UE 101 via a WLAN link. Such elements may be consistent with similarly numbered elements as described with reference to FIG. 2.

A protocol stack of the base station 111 includes upper layer protocols 240, a PDCP layer 242, a WRAP layer 252, a WT-BS security layer 254, an RLC layer 246, a MAC layer 248, and a physical layer 250. The protocol stack of the WLAN terminal 120 further includes a WRAP layer 224, a WT-BS security layer 226, an RLC layer 228, a MAC layer 230, and a physical layer 232, which may be used to communicate with the base station 111 via a cellular link. Such elements may be consistent with similarly numbered elements as described with reference to FIG. 2.

Figure 13:
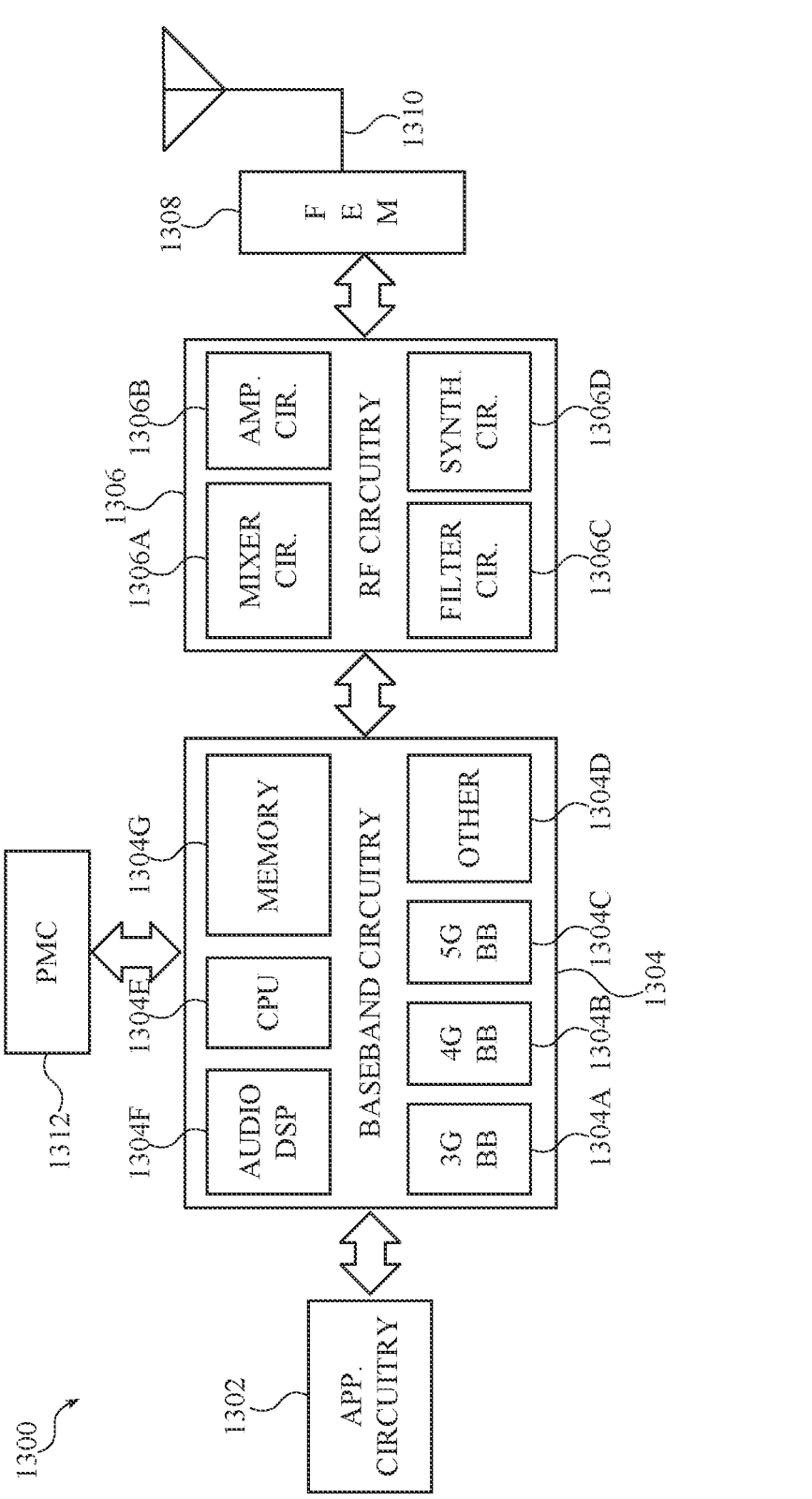
FIG. 13 is a block diagram illustrating a device that can be employed to perform WCA in accordance with some aspects of the present disclosure.

FIG. 13 is a diagram illustrating example components of a device 1300 that can be employed in accordance with some aspects of the present disclosure. In some aspects, the device 1300 can include application circuitry 1302, baseband circuitry 1304, Radio Frequency (RF) circuitry 1306, front-end module (FEM) circuitry 1308, one or more antennas 1310, and power management circuitry (PMC) 1312 coupled together at least as shown. The components of the illustrated device 1300 can be included, for example, in the UE 101, the WLAN terminal 120, and/or the base station 111 as described with reference to FIGS. 1-12 and throughout the present disclosure. The UE 101, the WLAN terminal, and the base station 111 may be configured to perform WCA, as described throughout the present disclosure. In some implementations, the device 1300 can include fewer elements (e.g., a RAN node may not utilize application circuitry 1302 and instead include a processor/controller to process IP data received from a CN, which may be a 5GC or an Evolved Packet Core (EPC)). In some implementations, the device 1300 can include additional elements such as, for example, memory/storage, display, camera, sensor (including one or more temperature sensors, such as a single temperature sensor, a plurality of temperature sensors at different locations in device 1300, etc.), or input/output (I/O) interface. In other implementations, the components described below can be included in more than one device (e.g., said circuitries can be separately included in more than one device for Cloud-RAN (C-RAN) implementations).

The application circuitry 1302 can include one or more application processors. For example, the application circuitry 1302 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1300. In some implementations, processors of application circuitry 1302 can process IP data packets received from an EPC.

The baseband circuitry 1304 can include circuitry such as, but not limited to, one or more single-core or multi-core processors. The baseband circuitry 1304 can include one or more baseband processors or control logic to process baseband signals received from a receive signal path of the RF circuitry 1306 and to generate baseband signals for a transmit signal path of the RF circuitry 1306. Baseband circuitry 1304 can interface with the application circuitry 1302 for generation and processing of the baseband signals and for controlling operations of the RF circuitry 1306. For example, in some implementations, the baseband circuitry 1304 can include a 3G baseband processor 1304A, a 4G baseband processor 1304B, a 5G baseband processor 1304C, or other baseband processor(s) 1304D for other existing generations, generations in development or to be developed in the future (e.g., 2G, 6G, etc.).

The baseband circuitry 1304 (e.g., one or more of baseband processors 1304A-D) can handle various radio control functions that enable communication with one or more radio networks via the RF circuitry 1306. In other implementations, some or all of the functionality of baseband processors 1304A-D can be included in modules stored in the memory 1304G and executed via a Central Processing Unit (CPU) 1304E. The radio control functions can include, but are not limited to, signal modulation/demodulation, encoding/decoding, radio frequency shifting, etc. In some implementations, the baseband circuitry 1304 can include one or more audio digital signal processor(s) (DSP) 1304F.

RF circuitry 1306 can enable communication with wireless networks using modulated electromagnetic radiation through a non-solid medium. In various implementations, the RF circuitry 1306 can include switches, filters, amplifiers, etc. to facilitate the communication with the wireless network. RF circuitry 1306 can include a receive signal path which can include circuitry to down-convert RF signals received from the FEM circuitry 1308 and provide baseband signals to the baseband circuitry 1304. RF circuitry 1306 can also include a transmit signal path which can include circuitry to up-convert baseband signals provided by the baseband circuitry 1304 and provide RF output signals to the FEM circuitry 1308 for transmission.

In some implementations, the receive signal path of the RF circuitry 1306 can include mixer circuitry 1306A, amplifier circuitry 1306B and filter circuitry 1306C. In some implementations, the transmit signal path of the RF circuitry 1306 can include filter circuitry 1306C and mixer circuitry 1306A. RF circuitry 1306 can also include synthesizer circuitry 1306D for synthesizing a frequency for use by the mixer circuitry 1306A of the receive signal path and the transmit signal path.

Figure 14:
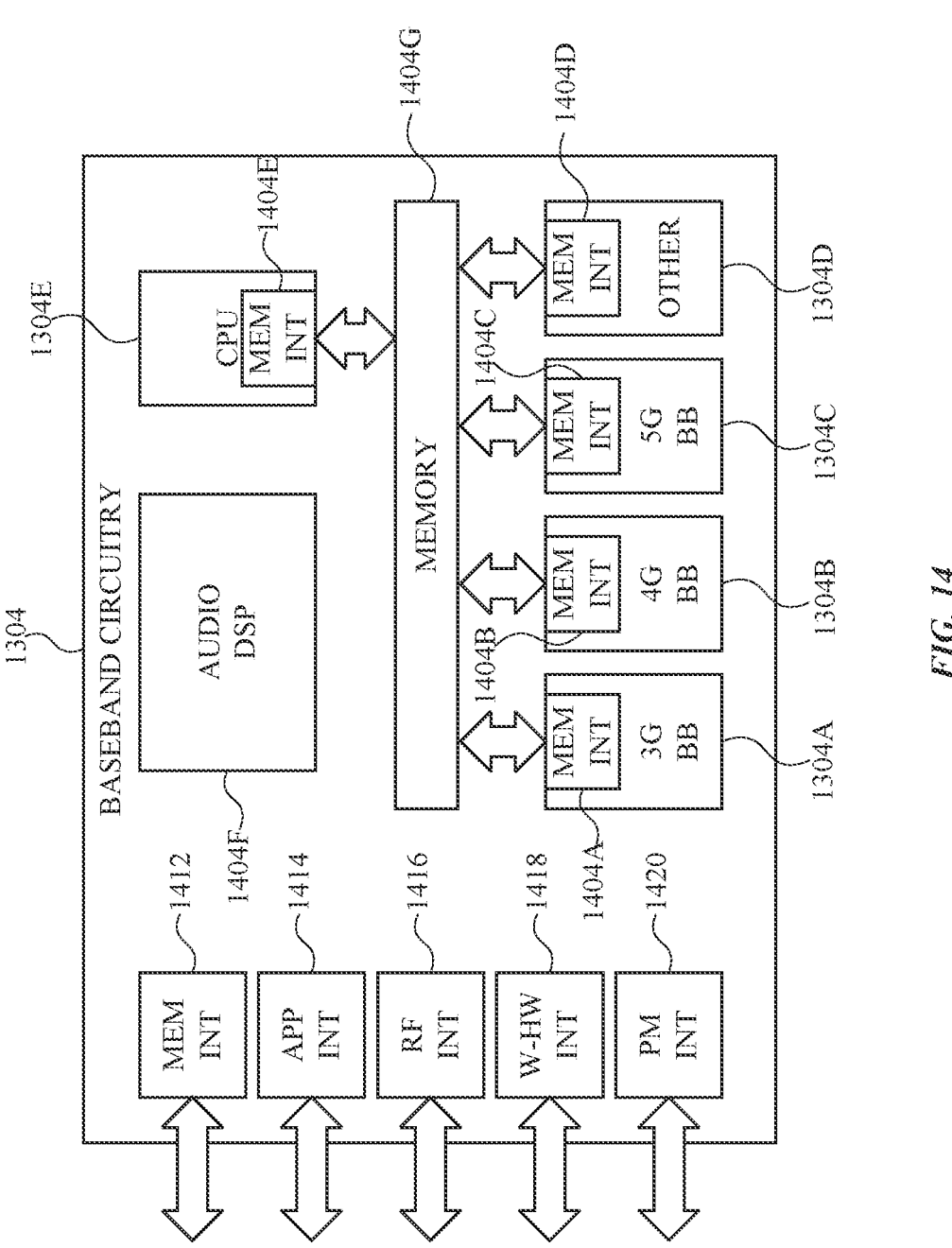
FIG. 14 is a block diagram illustrating baseband circuitry that can be employed to perform WCA in accordance with some aspects of the present disclosure.

FIG. 14 illustrates a diagram illustrating example interfaces of baseband circuitry that can be employed in accordance with some aspects. As discussed above, the baseband circuitry 1304 of FIG. 13 can comprise processors 1304A-1304E and a memory 1304G utilized by said processors. Each of the processors 1304A-1304E can include a memory interface, 1404A-1404E, respectively, to send/receive data to/from the memory 1304G. The baseband circuitry 1304, or the one or more baseband processors or control logic of the baseband circuitry 1304, may stand alone as the UE 101, the WLAN terminal 120, or the base station 111, and perform signaling and operation in the meaning as described throughout this disclosure.

The baseband circuitry 1304 can further include one or more interfaces to communicatively couple to other circuitries/devices, such as a memory interface 1412 (e.g., an interface to send/receive data to/from memory external to the baseband circuitry 1304), an application circuitry interface 1414 (e.g., an interface to send/receive data to/from the application circuitry 1302 of FIG. 13), an RF circuitry interface 1416 (e.g., an interface to send/receive data to/from RF circuitry 1306 of FIG. 13), a wireless hardware connectivity interface 1418 (e.g., an interface to send/receive data to/from Near Field Communication (NFC) components, Bluetooth® components (e.g., Bluetooth® Low Energy), Wi-Fi® components, and other communication components), and a power management interface 1420 (e.g., an interface to send/receive power or control signals to/from the PMC 1312).

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

Example 1 is a method to be performed by a wireless local area network (WLAN) terminal. The method comprises: receiving endpoint mapping information including a mapping between one or more radio bearers (RBs) and devices serving as endpoints of the one or more RBs, receiving a packet from a first device using a first wireless link, wherein the packet includes a packet header indicating a first RB identity (ID), and forwarding the packet to a second device using a second wireless link based on the first RB ID and the endpoint mapping information. The first wireless link includes a WLAN link and the second wireless link includes a cellular link, or the first wireless link includes the cellular link and the second wireless link includes the WLAN link.

Example 2 comprises the subject matter of any variation of example 1, wherein the first wireless link includes the WLAN link, the second wireless link includes the cellular link, the first device includes a user equipment (UE), the second device includes a base station, and the first RB ID indicates an RB between the UE and the base station.

Example 3 comprises the subject matter of any variation of example 2, wherein the packet header includes the endpoint mapping information, and wherein the packet header further includes: a second RB ID indicating a RB between the WLAN terminal and the base station, and a UE cellular ID.

Example 4 comprises the subject matter of any variation of example 3, wherein the method further comprises removing the second RB ID from the packet header before forwarding the packet to the second device.

Example 5 comprises the subject matter of any variation of example 2. The method further comprises, before receiving the packet: receiving, from the UE via the first wireless link, an indication of a UE cellular ID of the UE, determining a mapping between the UE cellular ID of the UE and a UE WLAN ID of the UE, storing the mapping between the UE cellular ID of the UE and the UE WLAN ID of the UE in a memory of the WLAN terminal, receiving the endpoint mapping information from the base station via the second wireless link, and storing the endpoint mapping information in the memory of the WLAN terminal. The endpoint mapping information includes a mapping between the first RB and one or more of: a second RB ID indicating a RB between the WLAN terminal and the base station, and the UE cellular ID.

Example 6 comprises the subject matter of any variation of example 5, wherein the packet indicates the UE WLAN ID, and wherein the method further comprises: identifying the UE cellular ID based on the mapping between the UE cellular ID and the UE WLAN ID, identifying the second RB ID based on the endpoint mapping information, and adding the UE cellular ID and the second RB ID to the packet header before forwarding the packet to the second device.

Example 7 comprises the subject matter of any variation of example 1, wherein the first wireless link includes the cellular link, the second wireless link includes the WLAN link, the first device includes a base station, the second device includes a user equipment, and the first RB ID indicates an RB between the UE and the base station.

Example 8 comprises the subject matter of any variation of example 7, wherein the packet header indicates the endpoint mapping information, and wherein the packet header further includes a UE WLAN ID of the UE.

Example 9 comprises the subject matter of any variation of example 8, wherein the method further comprises removing the UE WLAN ID from the packet header before forwarding the packet to the second device.

Example 10 comprises the subject matter of any variation of example 7. The method further comprises, before receiving the packet, receiving, from the UE via the first wireless link, an indication of a UE cellular ID of the UE, determining a mapping between the UE cellular ID of the UE and a UE WLAN ID of the UE, storing the mapping between the UE cellular ID of the UE and the UE WLAN ID of the UE in a memory of the WLAN terminal, receiving the endpoint mapping information from the base station via the second wireless link, and storing the endpoint mapping information in the memory of the WLAN terminal. The endpoint mapping includes a mapping between the first RB and one or more of: a second RB ID indicating a RB between the WLAN terminal and the base station, and the UE cellular ID.

Example 11 comprises the subject matter of any variation of example 10, wherein the packet indicates the UE cellular ID, and wherein the method further comprises: identifying the UE WLAN ID based on the mapping between the UE cellular ID and the UE WLAN ID, and removing the UE cellular ID from the packet header before forwarding the packet to the second device.

Example 12 is an apparatus of a user equipment (UE). The apparatus comprises a memory, and a processor coupled to the memory. The processor is configured to execute instructions stored in the memory to cause the UE to: receive a first configuration message from a base station to configure a first radio bearer (RB) for communicating with the base station, receive a second configuration message from the base station to configure a multi-hop link between the base station, a wireless local area network (WLAN) terminal, and the UE, and transmit a first packet to or receive a first packet from the WLAN terminal, wherein the first packet includes a packet header indicating an RB identity (ID) of the first RB.

Example 13 comprises the subject matter of any variation of example 12, wherein the processor further causes the UE to: disable packet data convergence protocol (PDCP) security in response to an indication that the WLAN terminal is a trusted WLAN terminal.

Example 14 comprises the subject matter of any variation of example 12, wherein the processor further causes the UE to: receive WLAN terminal discovery information from the base station, the WLAN terminal discovery information including a first list of candidate WLAN terminals, wherein the first list of candidate WLAN terminals includes the WLAN terminal, and select the WLAN terminal for use in multi-hop links.

Example 15 comprises the subject matter of any variation of example 14, wherein the processor further causes the UE to: detect one or more available WLAN terminals in range of the UE, generate a second list of candidate WLAN terminals based on the one or more available WLAN terminals, and transmit an indication of the second list of candidate WLAN terminals to the base station, wherein the first list of candidate WLAN terminals is a subset of the second list of candidate WLAN terminals.

Example 16 comprises the subject matter of any variation of example 14, wherein the processor further causes the UE to: generate a second list of candidate WLAN terminals based on the first list of candidate WLAN terminals, wherein the second list of candidate WLAN terminals is a subset of the first list of candidate WLAN terminals, and wherein the second list of candidate WLAN terminals includes the WLAN terminal.

Example 17 comprises the subject matter of any variation of example 12, wherein the first RB includes a data radio bearer (DRB).

Example 18 comprises the subject matter of any variation of example 12, wherein the first RB includes a signaling radio bearer (SRB).

Example 19 comprises the subject matter of any variation of example 12, wherein the second configuration message includes endpoint mapping information including a mapping between the first RB and a second RB to be used for communication between the WLAN terminal and the base station.

Example 20 comprises the subject matter of any variation of example 19, wherein the processor further causes the UE to add a RB ID of the second RB to the packet header before transmitting the first packet.

Example 21 comprises the subject matter of any variation of example 12, wherein the processor further causes the UE to: transmit a second packet to or receive a second packet from the base station, wherein the second packet is one of: a duplicate of the first packet, or different than the first packet.

Example 22 comprises the subject matter of any variation of example 21, wherein the processor further causes the UE to: in response to the second packet being a duplicate of the first packet, discarding the second packet after receiving the second packet from the base station.

Example 23 comprises the subject matter of any variation of example 12, wherein the processor further causes the UE to: in response to a WLAN handover process being initiated, ceasing communication using the first RB.

Example 24 is a base station. The base station comprises a memory, and a processor coupled to the memory. The processor is configured to execute instructions stored in the memory to cause the bast station to: transmit a first configuration message to a user equipment (UE) to configure a first radio bearer (RB) for communicating with the UE, transmit a second configuration message to the UE to configure a multi-hop link between the base station, a wireless local area network (WLAN) terminal, and the UE, and transmit a first packet to or receive the first packet from the WLAN terminal, wherein the first packet includes a UE identity (ID) of the UE and a RB ID of the first RB.

Example 25 comprises the subject matter of any variation of example 24, wherein the UE ID includes a UE cellular ID.

Example 26 comprises the subject matter of any variation of example 24, wherein the UE ID includes a UE WLAN ID.

Example 27 comprises the subject matter of any variation of example 26, wherein the processor further causes the base station to: receive an indication of the UE WLAN ID from the UE before transmitting the first packet to the UE.

Example 28 comprises the subject matter of any variation of example 24, wherein the processor further causes the base station to: receive an indication of an intention to provide a secure connection from the WLAN terminal; and in response to the indication, process the first packet at a WLAN-base station security layer before transmission of the first packet or after reception of the first packet.

Example 29 comprises the subject matter of any variation of example 24, wherein the second configuration message includes endpoint mapping information including a mapping between the first RB and a second RB to be used for communication between the base station and the WLAN terminal, and wherein the processor further causes the base station to transmit the first packet based on the endpoint mapping information.

Example 30 comprises the subject matter of any variation of example 24, wherein the processor further causes the base station to transmit a second packet to or receive a second packet from the UE, wherein the second packet is one of: a duplicate of the first packet, or different than the first packet.

Example 31 comprises the subject matter of any variation of example 30, wherein the processor further cause the base station to: in response to the second packet being a duplicate of the first packet, discarding the second packet after receiving the second packet from the UE.

Example 32 comprises the subject matter of any variation of example 24, wherein the processor further causes the base station to: receive, from the WLAN terminal, an indication that the WLAN terminal can act as a relay in the multi-hop link, wherein the WLAN terminal is a UE.

Example 33 comprises the subject matter of any variation of example 24, wherein transmitting or receiving the first packet includes encoding or decoding the first packet using a WLAN ethernet type for WLAN cellular aggregation (WCA).

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method to be performed by a wireless local area network (WLAN) terminal, the method comprising:

receiving endpoint mapping information including a mapping between one or more radio bearers (RBs) and devices serving as endpoints of the one or more RBs;

receiving a packet from a first device using a first wireless link, wherein the packet includes a packet header indicating a first RB identity (ID); and forwarding the packet to a second device using a second wireless link based on the first RB ID and the endpoint mapping information;

wherein the first wireless link includes a WLAN link and the second wireless link includes a cellular link, or the first wireless link includes the cellular link and the second wireless link includes the WLAN link.

2. The method of claim 1, wherein:

the first wireless link includes the WLAN link;

the second wireless link includes the cellular link;

the first device includes a user equipment (UE);

the second device includes a base station; and the first RB ID indicates an RB between the UE and the base station.

3. The method of claim 2, wherein the packet header includes the endpoint mapping information, and wherein the packet header further includes:

a second RB ID indicating an RB between the WLAN terminal and the base station; and a UE cellular ID.

4. The method of claim 3, further comprising:

removing the second RB ID from the packet header before forwarding the packet to the second device.

5. The method of claim 2, further comprising, before receiving the packet:

receiving, from the UE via the first wireless link, an indication of a UE cellular ID of the UE;

determining a mapping between the UE cellular ID of the UE and a UE WLAN ID of the UE;

storing the mapping between the UE cellular ID of the UE and the UE WLAN ID of the UE in a memory of the WLAN terminal;

receiving the endpoint mapping information from the base station via the second wireless link; and storing the endpoint mapping information in the memory of the WLAN terminal;

wherein the endpoint mapping information includes a mapping between the first RB and one or more of: a second RB ID indicating a RB between the WLAN terminal and the base station, or the UE cellular ID.

6. The method of claim 5, wherein the packet indicates the UE WLAN ID, and wherein the method further comprises:

identifying the UE cellular ID based on the mapping between the UE cellular ID and the UE WLAN ID;

identifying the second RB ID based on the endpoint mapping information; and adding the UE cellular ID and the second RB ID to the packet header before forwarding the packet to the second device.

7. The method of claim 1, wherein:

the first wireless link includes the cellular link;

the second wireless link includes the WLAN link;

the first device includes a base station;

the second device includes a user equipment (UE); and the first RB ID indicates an RB between the UE and the base station.

8. The method of claim 7, wherein the packet header indicates the endpoint mapping information, and wherein the packet header further includes a UE WLAN ID of the UE.

9. The method of claim 8, further comprising:

removing the UE WLAN ID from the packet header before forwarding the packet to the second device.

10. The method of claim 7, further comprising, before receiving the packet:

receiving, from the UE via the first wireless link, an indication of a UE cellular ID of the UE;

determining a mapping between the UE cellular ID of the UE and a UE WLAN ID of the UE;

storing the mapping between the UE cellular ID of the UE and the UE WLAN ID of the UE in a memory of the WLAN terminal;

receiving the endpoint mapping information from the base station via the second wireless link; and storing the endpoint mapping information in the memory of the WLAN terminal;

wherein the endpoint mapping information includes a mapping between the first RB and one or more of: a second RB ID indicating an RB between the WLAN terminal and the base station, or the UE cellular ID.

11. The method of claim 10, wherein the packet indicates the UE cellular ID, and wherein the method further comprises:

identifying the UE WLAN ID based on the mapping between the UE cellular ID and the UE WLAN ID; and removing the UE cellular ID from the packet header before forwarding the packet to the second device.

12. An apparatus of a user equipment (UE), comprising:

a memory; and a processor coupled to the memory, wherein the processor is configured to execute instructions stored in the memory to cause the UE to:

receive a first configuration message from a base station to configure a first radio bearer (RB) for communicating with the base station;

receive a second configuration message from the base station to configure a multi-hop link between the base station, a wireless local area network (WLAN) terminal, and the UE; and transmit a first packet to or receive a first packet from the WLAN terminal, wherein the first packet includes a packet header indicating an RB identity (ID) of the first RB.

13. The apparatus of claim 12, wherein the processor further causes the UE to:

disable packet data convergence protocol (PDCP) security in response to an indication that the WLAN terminal is a trusted WLAN terminal.

14. The apparatus of claim 12, wherein the processor further causes the UE to:

receive WLAN terminal discovery information from the base station, the WLAN terminal discovery information including a first list of candidate WLAN terminals, wherein the first list of candidate WLAN terminals includes the WLAN terminal; and select the WLAN terminal for use in multi-hop links.

15. The apparatus of claim 14, wherein the processor further causes the UE to:

detect one or more available WLAN terminals in range of the UE;

generate a second list of candidate WLAN terminals based on the one or more available WLAN terminals; and transmit an indication of the second list of candidate WLAN terminals to the base station;

wherein the first list of candidate WLAN terminals is a subset of the second list of candidate WLAN terminals.

16. The apparatus of claim 14, wherein the processor further causes the UE to:

generate a second list of candidate WLAN terminals based on the first list of candidate WLAN terminals, wherein the second list of candidate WLAN terminals is a subset of the first list of candidate WLAN terminals, and wherein the second list of candidate WLAN terminals includes the WLAN terminal.

17. The apparatus of claim 12, wherein the first RB includes a data radio bearer (DRB).

18. The apparatus of claim 12, wherein the first RB includes a signaling radio bearer (SRB).

19. The apparatus of claim 12, wherein the second configuration message includes endpoint mapping information including a mapping between the first RB and a second RB to be used for communication between the WLAN terminal and the base station.

20. The apparatus of claim 19, wherein the processor further causes the UE to add an RB ID of the second RB to the packet header before transmitting the first packet.

21. The apparatus of claim 12, wherein the processor further causes the UE to:

transmit a second packet to or receive a second packet from the base station, wherein the second packet is one of: a duplicate of the first packet, or different than the first packet.

22. The apparatus of claim 21, wherein the processor further causes the UE to:

in response to the second packet being a duplicate of the first packet, discarding the second packet after receiving the second packet from the base station.

23. The apparatus of claim 12, wherein the processor further causes the UE to:

in response to a WLAN handover process being initiated, ceasing communication using the first RB.

24. A base station, comprising:

a memory; and a processor coupled to the memory, wherein the processor is configured to execute instructions stored in the memory to cause the base station to:

transmit a first configuration message to a user equipment (UE) to configure a first radio bearer (RB) for communicating with the UE;

transmit a second configuration message to the UE to configure a multi-hop link between the base station, a wireless local area network (WLAN) terminal, and the UE; and transmit a first packet to or receive the first packet from the WLAN terminal, wherein the first packet includes a UE identity (ID) of the UE and an RB ID of the first RB.

25. The base station of claim 24, wherein the UE ID includes a UE cellular ID.

26. The base station of claim 24, wherein the UE ID includes a UE WLAN ID.

27. The base station of claim 26, wherein the processor further causes the base station to:

receive an indication of the UE WLAN ID from the UE before transmitting the first packet to the WLAN terminal.

28. The base station of claim 24, wherein the processor further causes the base station to:

receive an indication of an intention to provide a secure connection from the WLAN terminal; and in response to the indication, process the first packet at a WLAN-base station security layer before transmission of the first packet or after reception of the first packet.

29. The base station of claim 24, wherein the second configuration message includes endpoint mapping information including a mapping between the first RB and a second RB to be used for communication between the base station and the WLAN terminal, and wherein the processor further causes the base station to transmit the first packet based on the endpoint mapping information.

30. The base station of claim 24, wherein the processor further causes the base station to transmit a second packet to or receive a second packet from the UE, wherein the second packet is one of: a duplicate of the first packet, or different than the first packet.

31. The base station of claim 30, wherein the processor further causes the base station to:

in response to the second packet being a duplicate of the first packet, discarding the second packet after receiving the second packet from the UE.

32. The base station of claim 24, wherein the processor further causes the base station to:

receive, from the WLAN terminal, an indication that the WLAN terminal is capable of acting as a relay in the multi-hop link;

wherein the WLAN terminal is a UE.

33. The base station of claim 24, wherein transmitting or receiving the first packet includes encoding or decoding the first packet using a WLAN ethernet type for WLAN cellular aggregation (WCA).

\* \* \* \* \*